United States Patent
Bhadra et al.

(10) Patent No.: US 10,343,139 B2
(45) Date of Patent: *Jul. 9, 2019

(54) PROCESSES USING IMPROVED RHO ADSORBENT COMPOSITIONS

(71) Applicant: Air Products and Chemicals, Inc., Allentown, PA (US)

(72) Inventors: Shubhra Jyoti Bhadra, Macungie, PA (US); Roger Dean Whitley, Allentown, PA (US); William Jack Casteel, Jr., Fountain Hill, PA (US); Timothy Christopher Golden, Nantes (FR); Garrett Chi-Ho Lau, New Tripoli, PA (US); Erin Marie Sorensen, Allentown, PA (US); Robert Quinn, Macungie, PA (US); Magdalena M. Lozinska, Dundee (GB); Paul A. Wright, St. Andrews (GB); Mohammad Ali Kalbassi, Surrey (GB)

(73) Assignee: Air Products and Chemicals, Inc., Allentown, PA (US)

( * ) Notice: Subject to any disclaimer, the term of this patent is extended or adjusted under 35 U.S.C. 154(b) by 125 days.

This patent is subject to a terminal disclaimer.

(21) Appl. No.: 15/718,620

(22) Filed: Sep. 28, 2017

(65) Prior Publication Data
US 2019/0091651 A1  Mar. 28, 2019

(51) Int. Cl.
| | | |
|---|---|---|
| *B01J 20/18* | (2006.01) | |
| *B01D 53/047* | (2006.01) | |
| *B01D 53/02* | (2006.01) | |
| *B01D 53/04* | (2006.01) | |
| *C01B 21/04* | (2006.01) | |
| *C01B 23/00* | (2006.01) | |
| *C01B 33/26* | (2006.01) | |
| *C01B 13/02* | (2006.01) | |
| *F25J 3/04* | (2006.01) | |

(52) U.S. Cl.
CPC .............. *B01J 20/18* (2013.01); *B01D 53/02* (2013.01); *B01D 53/047* (2013.01); *B01D 53/0423* (2013.01); *B01D 53/0473* (2013.01); *C01B 13/027* (2013.01); *C01B 21/0466* (2013.01); *C01B 23/0068* (2013.01); *C01B 33/28* (2013.01); *B01D 2253/1085* (2013.01); *B01D 2253/1122* (2013.01); *B01D 2253/304* (2013.01); *B01D 2256/12* (2013.01); *B01D 2256/18* (2013.01); *B01D 2257/102* (2013.01); *B01D 2257/104* (2013.01); *B01D 2259/402* (2013.01); *B01D 2259/414* (2013.01); *B01D 2259/4145* (2013.01); *B01D 2259/4146* (2013.01); *C01B 2210/0034* (2013.01); *C01B 2210/0045* (2013.01); *C01B 2210/0046* (2013.01); *F25J 3/04181* (2013.01); *F25J 3/04733* (2013.01); *F25J 2205/72* (2013.01)

(58) Field of Classification Search
None
See application file for complete search history.

(56) References Cited

U.S. PATENT DOCUMENTS

| | | | |
|---|---|---|---|
| 4,477,265 A | 10/1984 | Kumar et al. | |
| 5,294,418 A | 3/1994 | Ramprasad et al. | |
| 5,730,003 A | 3/1998 | Nguyen et al. | |
| 5,944,876 A | 8/1999 | Corbin et al. | |
| 6,500,235 B2 | 12/2002 | Zhong et al. | |
| 7,169,212 B1 * | 1/2007 | Corbin ................. | B01D 53/02 423/DIG. 31 |
| 2016/0151772 A1 | 6/2016 | Chen | |
| 2019/0091652 A1 * | 3/2019 | Lozinska ............... | B01J 20/186 |

FOREIGN PATENT DOCUMENTS

| | | |
|---|---|---|
| EP | 0867672 A1 | 9/1998 |
| WO | 08072215 A2 | 6/2008 |
| WO | 15020014 A1 | 2/2015 |

* cited by examiner

*Primary Examiner* — Tam M Nguyen
(74) *Attorney, Agent, or Firm* — Bryan C. Hoke, Jr.

(57) ABSTRACT

Disclosed herein are new processes for adsorbing oxygen using adsorbent compositions comprising RHO zeolites kinetically selective for oxygen. The RHO zeolites can be used in pressure swing adsorption processes for separating oxygen from oxygen containing streams, such as for, but not limited to, purifying a crude argon feed stream or separating oxygen from an air feed stream.

20 Claims, 15 Drawing Sheets

PROCESSES USING IMPROVED RHO ADSORBENT COMPOSITIONS

TECHNICAL FIELD

This disclosure relates to new processes for adsorbing oxygen using adsorbent compositions. More specifically, this disclosure relates to adsorption processes, and in particular pressure swing adsorption (PSA) processes, using adsorbents that are zeolites of the RHO-type (hereinafter referred to as RHO zeolites), suitable for separating oxygen from oxygen containing streams, such as for, but not limited to, purifying a crude argon feed stream or separating oxygen from an air feed stream. This disclosure also relates to adsorption processes, such as PSA processes, for adsorbing oxygen and nitrogen, such as for separating oxygen and nitrogen from a feed stream such as, but not limited to, a crude argon feed stream or air feed stream. Also disclosed herein are RHO zeolite adsorbents that are kinetically selective adsorbents for oxygen, effective at ambient or sub-ambient temperatures, RHO zeolite adsorbents useful for separating nitrogen from air or removal of trace $N_2$ from argon, RHO zeolite adsorbents useful for removal of $CO_2$ from methane, and methods of making the same.

BACKGROUND

In the gas production industry, there is a need to efficiently separate oxygen from oxygen containing streams at ambient or sub-ambient temperatures.

In cryogenic air separation, nitrogen ($N_2$), oxygen ($O_2$) and argon (Ar) are separated based on their boiling points and relative volatilities. A first cryogenic column provides a rough separation of the three main components of air: $N_2$ (78%), $O_2$ (21%), and Ar (1%). A side stream is removed and sent to a second column known as the side arm column or crude argon column. This stream is called "crude" because it exits this side arm column at only about 95% argon. The conventional methods of further purifying this crude argon are limited to: "Deoxo" purification, getter bed technologies, and additional distillation. The Deoxo process reacts controlled amounts of hydrogen with the oxygen in the argon stream to remove the oxygen. Because the reaction of hydrogen and oxygen generates significant heat, this process can be dangerous if not controlled properly. Getter beds only function at lower oxygen concentrations by reacting oxygen with copper catalyst to form copper oxide. When high purity argon is desired, a third distillation column can be used to further concentrate it. Unfortunately, these distillation columns require upwards of 200 stages due to the similarity in boiling points of $O_2$ and Ar and are less economical than is desired.

To achieve a kinetic separation of $O_2$ from either $N_2$ or Ar by an adsorption mechanism, an adsorbent structure must be developed with very specific pore dimensions. The Lennard-Jones 6-12 kinetic diameter of Ar (3.40 Å) is smaller than that of $O_2$ (3.46 Å), but $O_2$ is not a spherical molecule and has a minimum molecular dimension that could be exploited. The symbol Å represents the Ångström, a unit of length, which is defined as $10^{-10}$ meters. Adsorption mechanisms suggest that the minimum molecular dimension is the limiting factor for kinetic exclusion. With the proper orientation, $O_2$ should diffuse into a pore with an effective diameter of 2.8 Å. Argon, a spherical atom, will have a constant diameter of 3.4 Å. This 0.6 Å difference in diameters is the key sensitivity that an $O_2$ selective adsorbent must demonstrate to achieve a kinetic separation between oxygen and argon. With such an adsorbent, a process could be derived that purifies crude argon from the cryogenic air separation process in a safer and more economical manner and removes $O_2$ from argon much more rapidly and efficiently.

Compared to the conventional, very elaborate methods of recovering argon from a crude argon stream, a PSA process provides a simple and effective alternative for argon purification and recovery. No hydrogen or additional cryogenic stages are required. However, removing oxygen and nitrogen simultaneously from crude argon stream requires either two separate PSA stages or a PSA column comprising two layers of adsorbents with different utility characteristics.

Kumar et al. in U.S. Pat. No. 4,477,265, discloses a two stage VSA (vacuum swing adsorption) process for argon purification. The two layers of adsorbents for oxygen and nitrogen removal are in two separated stages. The two stages are connected in series. This allows the process to be more flexible. For example, it permits possible bed interactions even within a stage and using different number of beds in different stages. In one preferred embodiment, three beds are in fact used in the first stage for nitrogen removal using a nitrogen equilibrium selective adsorbent. Two beds are in the second stage for oxygen removal using an oxygen rate selective adsorbent. The basic cycle steps include adsorption, evacuation, and pressurization. Also, argon recovery is low, and recycling the waste stream, still containing considerable amount of argon, back to cryogenic unit is necessary for additional recovery. Recycling of VSA waste stream back to the cryogenic plant makes the air separation unit more complex and a VSA option less attractive. It is important to note that a VSA instead of a PSA process is used in the layer bed configuration.

Pressure swing adsorption (PSA) processes comprising several layers of adsorbents are known in the open literature. However, the arrangement of the two layers of adsorbents with different characteristics in the same PSA column requires careful consideration. For example, one layer may be composed of an adsorbent with kinetic selectivity to the contaminant gas, where the product gas has very slow diffusion kinetics relative to the contaminant gas. Another layer may be composed of an adsorbent, which separates gases based on differences in equilibrium capacities, where the contaminant gas is more adsorbed than the product gas. The application WO2008072215A2 discloses such a PSA process for upgrading natural gas. The novelty described in this application is the non-conventional arrangement of an adsorbent with smaller capacity and performing a kinetic separation, followed by an adsorbent performing the separation by differences in the adsorption equilibrium of the species. Note that only one component is removed by the two layers.

U.S. Pat. No. 5,730,003 describes a hybrid process where crude argon produced in a cryogenic distillation plant is processed in a 2-bed pressure swing adsorption (PSA) unit to produce 99.999% argon. If the crude argon contains significant amount of nitrogen in addition to oxygen, the patent reports to include a nitrogen selective adsorbent in a layer separate from the oxygen selective layer. Carbon molecular sieve (CMS), type A zeolite, clinoptilolite, and the adsorbents disclosed in U.S. Pat. No. 5,294,418 are used as an oxygen selective layer. As a nitrogen selective layer, adsorbents such as CaA, type X zeolite (LiX or NaX), and zeolite of type A & X containing mixed cations selected from groups I and II of the periodic table (LiNaX) are mentioned. The layering preference, PSA feed temperature and regeneration conditions are not reported. In the description of the PSA process, an optional vacuum pump is incorporated. It is not clear whether the adsorption process operates under pressure swing or vacuum swing mode for simultaneous removal of oxygen and nitrogen from argon stream using the layered bed.

Carbon molecular sieves (CMSs) have been developed that selectively adsorb $O_2$ over $N_2$ based on the smaller kinetic diameter of the $O_2$ molecule, see e.g. Yang, R. T., *Gas Separation by Adsorption Processes*, Butterworths, Boston, 1987. More recently, in S. U. Rege and R. T. Yang, *Adsorption*, 2000, Vol. 6, 15-22; and U.S. Pat. No. 7,501,009 to Graham, et al., CMSs are proposed for removal of $O_2$ from Ar by kinetic separation.

Nevertheless, use of CMSs for the purification of crude $N_2$ or Ar presents several problems, including, but not limited to, a potential for combustion if CMS dust is returned to the cryogenic distillation tower and low recovery due to variable pore size distribution. Zeolites are porous aluminosilicates, which are non-combustible, more stable towards oxygen exposure than CMSs, and contain well controlled pore sizes based on their highly crystalline structure. Thus, they have the potential to overcome many of these drawbacks.

An inherent problem with many kinetic PSA processes for the purification of crude $N_2$ or Ar utilizing either zeolite or CMS adsorbent is low recovery of the desired $N_2$ or Ar product due to low utilization of the full capacity of adsorbent. This arises because where feed step must be stopped well before adsorbent saturation to avoid contamination of the primary product with a high level of the impurity. In such case, it is necessary to recycle the PSA waste stream, still containing significant amount of argon or nitrogen, back to the cryogenic air separation unit for additional recovery. An improvement in kinetic selectivity would enhance the bed utilization, and thus the final argon recovery.

A RHO zeolite has a symmetric, three-dimensional pore structure containing channels with openings made up of two 8-membered oxygen rings. The nominal ring diameter or opening is 3.6 Å. This is close to the target pore dimensions, mentioned above, for the kinetic separation of $O_2$ from Ar and $N_2$, and $N_2$ from Ar vide supra. This pore dimension could also be useful in the separation of $CO_2$ from methane.

RHO zeolites require the presence of large cesium extra-framework cations as the structure directing agent during synthesis, and do not occur naturally. They were first prepared in 1973 by Robson and coworkers (*Advances in Chemistry Series*, 1973, 121, 106.). This initial synthesis used no additional organic templating agents and produced RHO materials with a ratio of Si to Al atoms equal to 3.2, hereafter specified by the shorthand RHO(3.2). More recently, RHO zeolites have been synthesized by Chatelain and coworkers using 18-crown-6 as a templating agent (*Microporous Materials*, 1995, 4, 231). The templated method gives highly crystalline RHO with Si/Al=3.9 to 4.5, i.e., RHO(3.9) to RHO(4.5). The preponderance of structural work with RHO has been carried out with RHO(3.2) and RHO(3.9) materials. RHO compositions with Si/Al>4.7 have been reported by Mitsubishi Chemical in WO15020014A1 through a mixing modification of the Chatelain procedure. They specifically claim copper and iron exchanged RHO materials at these higher Si/Al ratios for NOx reduction applications, but mention other transition metals, including zinc, in their background. The use of any of these materials in air separation is not mentioned. Lower Si/Al compositions with only copper, iron, or zinc are not taught, and it is not obvious that they would be stable, based on the greater basicity of the lower Si/Al RHO materials. In U.S. Pat. No. 5,944,876, Corbin teaches of fully and partially cadmium (Cd) exchanged RHO zeolites, with Si/Al>3, including RHO compositions with at least 1 $Cd^{2+}$ cation per unit cell, with an assortment of other cations, including $Zn^{2+}$. Because of the size of the $Cd^{2+}$ cations, these compositions require at least one cation, namely the $Cd^{2+}$ cation, to reside in an 8-ring position. Corbin does not teach how to prepare Cd RHO materials with a balance of $Zn^{2+}$ cations. It is not obvious that RHO compounds with 3<Si/Al<5 would be stable if <one cation per unit cell was required to occupy one of the 8-ring positions, due to the greater basicity of lower Si/Al RHO compositions.

Higher Si/Al RHO materials with Si/Al>5 have been prepared by use of excessive templating agent (Ke Q., Sun T., Cheng H., Chen H., Liu X., Wei X., Wang S. *Chem Asian J.*, 2017, 12, 1043.)

The as-prepared, hydrated, RHO zeolites crystallize with a centrosymmetric body centered cubic (bcc) structure, but it has been shown that this structure can undergo rather large distortions to lower symmetry upon dehydration and depending on the type of extra-framework cation substitution. The distortion, which can be observed as a large unit cell contraction, is largely driven by the distortion of the RHO 8-rings. Corbin and coworkers have shown that the undistorted, essentially circular rings of the proton exchanged RHO can distort to highly elliptical rings on exchange of small, high charge density cations such as $Ca^{2+}$ and $Li^+$ (*Journal of the American Chemical Society*, 1990, 112, 4821).

In principal, this distortion mechanism could be used to tune the ring size, shape, or diameter to selectively adsorb certain gases over others by size exclusion processes. This mechanism has been exploited by Corma and coworkers (*Chemical Communications*, 2012, 48(2), 215) and Wright and coworkers (*Journal of the American Chemical Society*, 2012, 134, 17628) to achieve large equilibrium selectivity for $CO_2$ adsorption over methane. In U.S. Pat. No. 7,169, 212, Corbin describes the use of mixed-cation RHO zeolite, $Li_{7.1}Na_{1.93}Cs_{0.3}Al_{11.7}Si_{36.3}O_{96}$, also specified here by the shorthand notations of $Li_{7.1}Na_{1.93}Cs_{0.3}RHO(3.1)$ for separation of oxygen from nitrogen in a PSA process. In this last case, though the kinetic selectivity for oxygen vs. nitrogen adsorption is extremely high, the RHO 8-ring size has been made sufficiently small that the uptake of even the smaller gas, oxygen, is extremely slow and is not practical for standard PSA applications.

Several researchers mention equilibrium-based separations of $O_2$ from Ar, but there are few rapid kinetic separations reported. Most of these kinetic separations use carbon molecular sieves (CMS), which, by size-selectivity, are able to adsorb $O_2$ at rates about 30× faster than Ar at ambient temperatures (U.S. Pat. No. 6,500,235 and S. U. Rege and R. T. Yang, *Adsorption*, 2000, Vol. 6, 15-22). U.S. Pat. No. 6,500,235 also mentions the use of a transition metal containing metal organic framework (MOF). Both materials show relatively slow uptake and, because these materials contain organic components, the adsorption process waste streams must be filtered if the streams are to be recycled back to a cryogenic plant. CMS materials are typically not suitable for separation of $N_2$ from Ar, because they have essentially no equilibrium selectivity and limited kinetic selectivity between these two gases.

Only a few zeolite materials have been reported for the kinetic separation of $O_2$ from $N_2$ or Ar at ambient temperatures. S. Kuznicki, B. Dunn, E Eyring, and D. Hunter (*Separation Science and Technology*, 2009, 44:7, pp 1604-1620) report the kinetic separation of $O_2$ from Ar using the Ba exchanged titanosilicate, Ba-RPZ-3. Rates appear to be slow for this material and the kinetic selectivity of $O_2/Ar$ is less than 10. S. Farooq (Gas Separations and Purification, Vol. 9, No. 3, pp 205-212) describes the possible use of a modified 4 A material, RS-10, from UOP. This is the only commercial zeolite based material which, at ambient temperatures, shows kinetic selectivity for $O_2$ adsorption over $N_2$ and Ar comparable to CMSs, at similar $O_2$ uptake rates to the CMS materials.

D. W. Breck (*Zeolite Molecular Sieves*, Robert E. Krieger Publishing Co., 1984) describes the use of zeolite 4 A at sub-ambient temperatures for kinetic $O_2/N_2$ and $O_2/Ar$ separations.

Kovak et al. in U.S. Pat. No. 5,159,816 mention the use of a list of zeolite adsorbents including 5 A, 4 A, mordenite, 13X, and chabazite for removing $N_2$ and $O_2$ from Ar in a cryogenic TSA process.

Therefore, it remains desirable to develop adsorption processes that are useful for the separation of $O_2$ from mixtures, such as those containing also $N_2$ and/or Ar, that have at least comparable recovery to existing processes using CMS materials, but that are capable of operating at much higher adsorption and desorption rates. It also remains desirable to develop processes that are useful also for the removal of low levels of $N_2$ from Ar.

SUMMARY

Disclosed herein are novel adsorption processes using RHO zeolite compositions that aim to address the above and/or other goals. Also disclosed herein are novel RHO zeolite compositions, useful in the above processes and others, such as for removal of $CO_2$ from methane. Also disclosed herein are novel methods of making RHO zeolite compositions.

In one aspect of the present invention as disclosed herein, there is provided a process of adsorbing oxygen from a feed stream containing oxygen, comprising passing the feed stream through a bed of an adsorbent selective for oxygen so as to adsorb oxygen from the feed stream, thereby producing a product stream depleted in oxygen, wherein the adsorbent comprises a RHO zeolite having a Si/Al ratio of from 3.2 to 4.5 and containing non-proton extra-framework cations, wherein the size, number and charge of the extra-framework cations that are present in the zeolite are such that 1.8 or fewer, and more preferably 1.6 or fewer non-proton extra-framework cations per unit cell are required to occupy 8-ring sites, and wherein the zeolite has a unit cell axis length of from 14.23 Å to 14.55 Å, more preferably of from 14.23 Å to 14.50 Å or from 14.30 Å to 14.45 Å. Preferably, the zeolite contains at most 6 protons per unit cell, and more preferably at most 5, or 4, or 3 protons per unit cell. In preferred embodiments the process is a pressure swing adsorption (PSA) process.

In another aspect of the present invention as disclosed herein, there is provided a process of adsorbing oxygen and nitrogen from a feed stream comprising oxygen, nitrogen, and argon, comprising passing the feed stream through one or more beds of adsorbent comprising a first adsorbent selective for nitrogen to adsorb nitrogen from the feed stream and a second adsorbent selective for oxygen to adsorb oxygen from the feed stream, thereby producing a product stream enriched in argon and depleted in oxygen and nitrogen. The second adsorbent comprises a RHO zeolite having a Si/Al ratio of from 3.2 to 4.5 and containing non-proton extra-framework cations, wherein the size, number and charge of the extra-framework cations that are present in said RHO zeolite are such that 1.8 or fewer, and more preferably 1.6 or fewer non-proton extra-framework cations per unit cell are required to occupy 8-ring sites, and wherein the zeolite has a unit cell axis length of from 14.23 Å to 14.55 Å, more preferably of from 14.23 Å to 14.50 Å or from 14.30 Å to 14.45 Å, and wherein the zeolite preferably contains at most at most 6 protons per unit cell, and more preferably at most 5, or 4, or 3 protons per unit cell. The first adsorbent preferably has a Henry's law constant for nitrogen of from 0.5 to 3.0 mmole/gm/bara at 37.78°C. In preferred embodiments the process is a pressure swing adsorption (PSA) process.

Accordingly, the present invention includes the following aspects (referred to as Aspects 1 to 20):

Aspect 1. A process of adsorbing oxygen from a feed stream containing oxygen, comprising passing the feed stream through a bed of an adsorbent selective for oxygen so as to adsorb oxygen from the feed stream, thereby producing a product stream depleted in oxygen, wherein the adsorbent comprises a RHO zeolite having a Si/Al ratio of from 3.2 to 4.5 and containing non-proton extra-framework cations, wherein the size, number, and charge of the extra-framework cations that are present in the zeolite are such that 1.8 or fewer non-proton extra-framework cations per unit cell are required to occupy 8-ring sites, and wherein the zeolite has a unit cell axis length of from 14.23 Å to 14.55 Å.

Aspect 2. The process of Aspect 1, wherein the feed stream comprises oxygen and one or both of nitrogen and argon, and the product stream is depleted in oxygen and enriched in one or both of nitrogen and argon.

Aspect 3. The process of Aspect 1 or 2, wherein the size, number and charge of the extra-framework cations that are present in the zeolite are such that 1.6 or fewer, or 1.4 or fewer, or 1.2 or fewer, or 1.0 or fewer non-proton extra-framework cations per unit cell are required to occupy 8-ring sites.

Aspect 4. The process of any one of Aspects 1 or 3, wherein the zeolite contains at most 6 protons per unit cell, and more preferably at most 5 protons per unit cell.

Aspect 5. The process of any one of Aspects 1 to 4, wherein the zeolite contains at most 4 protons per unit cell.

Aspect 6. The process of any one of Aspects 1 to 5, wherein the zeolite contains at most 3 protons per unit cell.

Aspect 7. The process of any one of Aspects 1 to 6, wherein the zeolite has a unit cell axis length of from 14.23 Å to 14.50 Å.

Aspect 8. The process of any one of Aspects 1 to 7, wherein the zeolite has a unit cell axis length of from 14.30 Å to 14.45 Å.

Aspect 9. The process of any one of Aspects 1 to 8, wherein the zeolite has a Si/Al ratio of from 3.6 to 4.2.

Aspect 10. The process of any one of Aspects 1 to 9, wherein the non-proton extra-framework cations comprise $Li^+$, $Mg^{2+}$, $Mn_{2+}$, $Fe^{2+}$, $Co^{2+}$, $Ni^{2+}$, $Cu^{2+}$ and/or $Zn^{2+}$ cations.

Aspect 11. The process of any one of Aspects 1 to 10, wherein the non-proton extra-framework cations comprise $Li^+$ and/or $Zn^{2+}$ cations.

Aspect 12. The process of Aspect 11, wherein said $Li^+$ and/or $Zn^{2+}$ cations make up the majority of the non-proton extra-framework cations that are present per unit cell.

Aspect 13. The process of Aspect 11 or 12, wherein said $Li^+$ and/or $Zn^{2+}$ cations make up at least 60% and more preferably at least 70% of the non-proton extra-framework cations that are present per unit cell.

Aspect 14. The process of any one of Aspects 11 to 13, wherein said Li$^+$ and/or Zn$^{2+}$ cations make up at least 80% or at least 90% of the non-proton extra-framework cations that are present per unit cell.

Aspect 15. The process of any one of Aspects 1 or 14, wherein the zeolite is selected from H$_6$Li$_{5.4}$RHO(3.2), Li$_{9.0}$K$_{0.8}$RHO(3.9), Li$_{9.0}$Na$_{0.8}$RHO(3.9), Li$_{8.3}$Cs$_{1.5}$RHO (3.9), Li$_{8.0}$Zn$_{1.7}$RHO(3.2), Zn$_{4.1}$Na$_{1.6}$RHO(3.9), Li$_{9.2}$H$_{0.6}$RHO(3.9), Li$_{9.2}$RHO(4.2), Li$_{6.0}$H$_{1.8}$Zn$_{1.0}$Na$_{0.6}$RHO(3.6), Li$_{7.8}$H$_{2.0}$RHO(3.9), Li$_{6.8}$H$_{3.0}$RHO(3.9) and Li$_{5.8}$H$_{4.0}$RHO(3.9).

Aspect 16. The process of any one of Aspects 1 to 15, wherein the process is a PSA process comprising an adsorption step performed at elevated pressure in which the feed stream is passed through a bed of the adsorbent comprising the RHO zeolite to adsorb oxygen from the feed stream, and a desorption step performed at reduced pressure in which oxygen from the previous adsorption step is desorbed from the bed to regenerate the bed for the next adsorption step.

Aspect 17. The process of any one of Aspects 1 to 16, wherein the process is process of adsorbing oxygen and nitrogen from a feed stream comprising oxygen, nitrogen, and argon, comprising passing the feed stream through one or more beds of adsorbent comprising a first adsorbent selective for nitrogen to adsorb nitrogen from the feed stream and a second adsorbent comprising the RHO zeolite to adsorb oxygen from the feed stream, thereby producing a product stream enriched in argon and depleted in oxygen and nitrogen.

Aspect 18. The process of Aspect 17, wherein the first adsorbent has a Henry's law constant for nitrogen of from 0.5 to 3.0 mmole/gm/bara at 37.78° C.

Aspect 19. The process of any one of Aspects 17 or 18, wherein the process is a PSA process comprising an adsorption step performed at elevated pressure in which the feed stream is passed through a bed of adsorbent comprising the first and second adsorbents to adsorb nitrogen and oxygen, respectively, thereby producing a product stream enriched in argon and depleted in oxygen and nitrogen, and a desorption step performed at reduced pressure in which oxygen and nitrogen from the previous adsorption step are desorbed from the bed to regenerate the bed for the next adsorption step.

Aspect 20. The process of Aspect 19, wherein the bed of adsorbent comprises a first layer comprising the first adsorbent and a second layer comprising the second adsorbent, the first and second layers being arranged such that during the adsorption step the feed stream passes through the first layer and contacts the first adsorbent for adsorption of nitrogen before passing through the second layer and contacting the second adsorbent for adsorption of oxygen.

DETAILED DESCRIPTION

Figure 1:
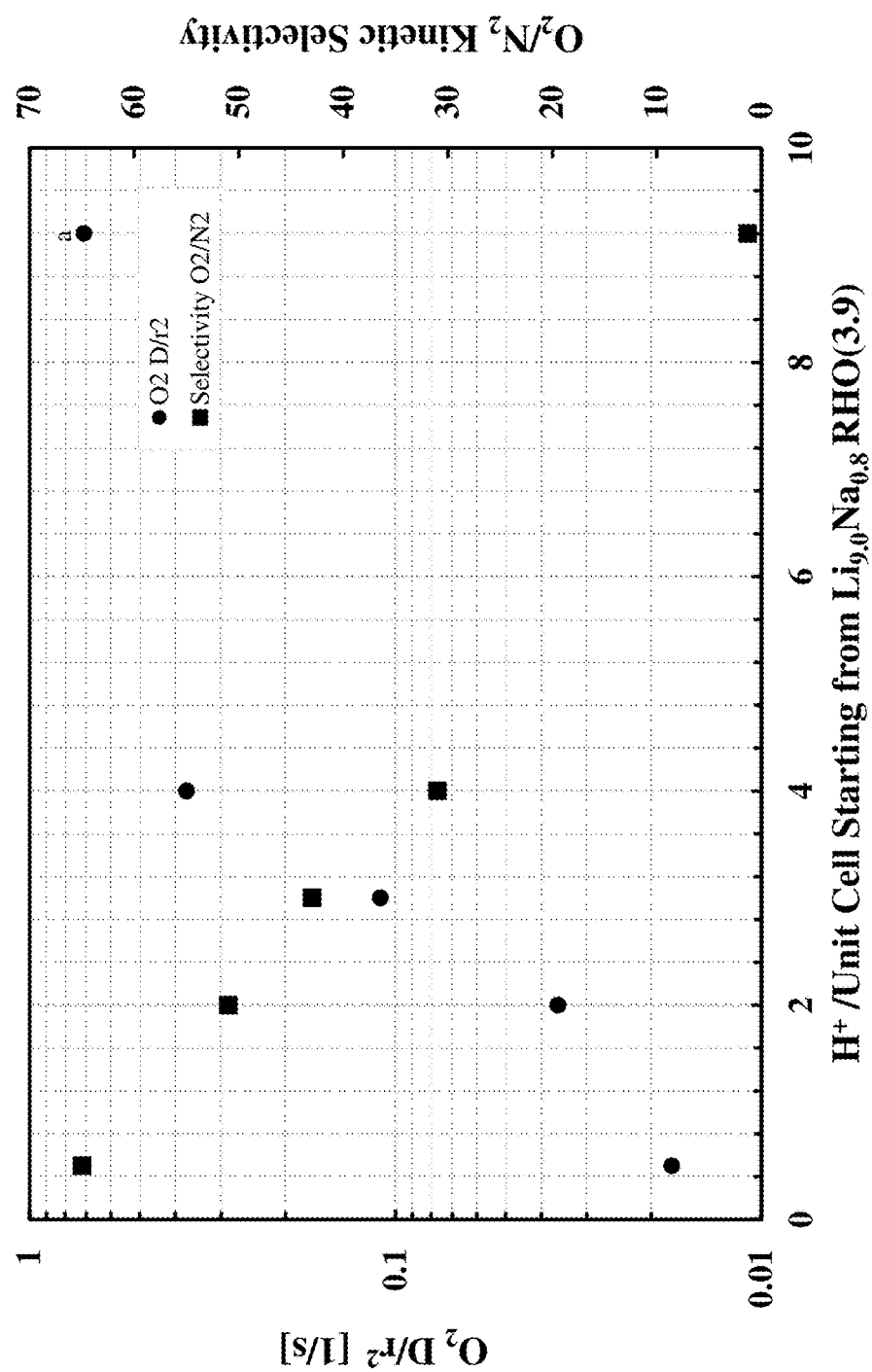
FIG. 1 is a graph of both O$_2$ uptake rate and kinetic selectivity of O$_2$ vs. N$_2$ plotted against the level of proton exchange in Li$_{9.0}$Na$_{0.8}$RHO(3.9). $^a$During full H$^+$ exchange of RHO(3.9) some framework de-alumination occurs resulting in a Si/Al of 4.2, or H$_{9.2}$RHO(4.2)

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from the scope of the claimed invention.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

As used herein, "first," "second," "third," etc. are used to distinguish from among a plurality of steps and/or features, and is not indicative of the total number, or relative position in time and/or space unless expressly stated as such.

As used herein, the term "comprising" means consisting of or including.

As used herein, the phrase "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

As will be understood by those skilled in the art, zeolite structures are often defined in terms of extended structural frameworks of oxygen-linked tetrahedra (L. Pauling, "The Nature of the Chemical Bond", $3^{rd}$ Edition, Cornell University Press, Ithaca, 1960. D. W. Breck, "Zeolite Molecular Sieves", Robert E. Krieger Publishing Co., 1984). In the extended tetrahedral framework, the so-called "framework cations" of the structural framework (i.e. silicon, $Si^{4+}$, and aluminum, $Al^{3+}$, cations) are surrounded by oxygen anions, $O^{2-}$, at the four corners of a tetrahedron. When the charge of the framework cation is "4+", as is the case when the framework cation is the silicon cation, charge neutrality of the extended tetrahedral framework is maintained by sharing each of the oxygen anions between, on average, two tetrahedra, each tetrahedron being a charge neutral "$SiO_4$". Conversely, where the charge of the framework cation is "3+", as is the case when the framework cation is the aluminum cation, similar sharing of oxygen anions between, on average, two tetrahedra leads to each aluminum-centered tetrahedron being negatively charged, i.e., "$AlO_4^-$". The resulting negative charge in the $[(Al_xSi_{1-x})O_2]^{x-}$ polyanionic framework is balanced by so-called "extra-framework cations" that are located at interstitial or non-framework sites in the extended structure. These charge-balancing extra-framework cations (which are often also called "non-framework cations") can often be exchanged with other cations by standard cation exchange methods. Exemplary extra-framework cations include alkali and alkaline earth metal cations, transition metal cations, and protons (i.e. hydrogen cations).

As will also be understood by those skilled in the art, although the extra-framework cations and framework cations present in a zeolite are referred to (as is conventional in the field) as cations, their interactions with the framework oxygen anions of the zeolite are not in practice fully ionic. The bonding of the framework silicon and aluminum cations to the oxygen anions is sufficiently covalent that these framework cations are not readily exchangeable with other cations by standard cation exchange methods. As regards the extra-framework cations, it is likely that smaller, higher charge density cations such as $Li^+$ or $Ca^{2+}$, that create larger distortions in the RHO framework than larger, lower charge density cations such as $K^+$ and $Cs^+$, do so, in part, as a result of greater covalent interaction with framework oxygen ions. Also as regards the extra-framework cations, the hydrogen cation or proton may perform its role in balancing negative framework charge by forming a relatively covalent bond with the framework oxygen anion (and indeed it has been hypothesized that in practice said protons associate with said oxygen anions in the form of structural hydroxyl groups; D. W. Breck, Zeolite Molecular Sieves, Robert E. Krieger Publishing Co., 1984).

As noted supra, RHO zeolites crystallize with a centrosymmetric body centered cubic (bcc) structure, and in their initially synthesized form contain sodium and cesium cations. However, dehydration and/or cation exchange (i.e. substitution of the initially present sodium and cesium cations with other extra-framework cations) can result in distortion of the cubic unit cell structure. As used herein, and unless otherwise indicated, the term "RHO zeolite" without any further qualifier encompasses both RHO zeolites in their initially synthesized form and RHO zeolites that have been dehydrated and/or subject to cation exchange.

As used herein, the term "non-proton extra-framework cation" refers to any extra-framework cation that is not a proton (hydrogen cation). Unless otherwise indicated, all references to numbers of non-proton extra-framework cations that are present per unit cell indicate total numbers of non-proton extra-framework cations (of any and all types) rounded to one decimal place. Thus, a requirement that there are "1.6 or fewer non-proton extra-framework cations per unit cell that are required to occupy 8-ring sites" indicates that the maximum number, rounded to one decimal place, of non-proton extra-framework cations per unit cell that may be required to occupy 8-ring sites is 1.6 non-proton extra-framework cations in total.

Unless otherwise indicated, all references to the number of protons that are present per unit cell indicate the number protons rounded to one decimal place. Thus, a requirement that "the zeolite contains at most 3 protons per unit cell" indicates that the zeolite contains at most 3.0 protons per unit cell (rounded to one decimal place), and so encompasses also zeolites containing no protons, but excludes zeolites containing 3.1 protons or more per unit cell.

The extra-framework cation content of a zeolite, namely the numbers, and types, of extra-framework cations (including any protons) that are present per unit cell, can be determined by standard experimental techniques. For example, the extra-framework cation content of a zeolite can be determined by elemental analysis of the solid by energy dispersive spectroscopy (EDX) or by dissolution of a sample and analysis of the solution using inductively coupled plasma optical emission spectroscopy (ICP-OES), as are also described in the Experimental section, infra. Where analysis of a zeolite by EDX or ICP-OES indicates that the negative charge per unit cell of the zeolite is not fully balanced by the non-proton extra-framework cations identified as being present, it is assumed that the remaining negative charge per unit cell is balanced by protons.

Unless otherwise indicated, all references herein to silicon to aluminum (Si/Al) ratios indicate Si/Al ratios rounded to one decimal place. The Si/Al ratio of a zeolite can, for example, be determined using solid state $^{29}Si$ NMR. Further details of suitable solid state $^{29}Si$ NMR techniques and methods of determining the Si/Al ratio of a zeolite from the resulting NMR data are provided in the Experimental section, infra.

As used herein, the term "majority" means more than 50%. Thus, reference herein to one or more cations making up the majority of the non-proton extra-framework cations that are present per unit cell of a RHO zeolite indicates that said cation or cations, in their totality, constitute more than 50% of all the non-proton extra-framework cations that are present per unit cell of the RHO zeolite.

As used herein, all references to percentages of cations that are or must be present per unit cell indicate atomic percent (at. %) unless otherwise indicated. Thus, reference herein to one or more cations making up at least "X" % of the non-proton extra-framework cations that present per unit cell of a RHO zeolite indicates that said cation or cations, in their totality, constitute equal to or greater than X at. % of all the non-proton extra-framework cations that are present per unit cell of the RHO zeolite. For example, in the zeolite $Li_{6.0}H_{1.8}Zn_{1.0}Na_{0.6}RHO(3.6)$ there are 7.6 non-proton extra-framework cations per unit cell, of which 7.0 in total are $Li^+$ or $Zn^{2+}$ cations; thus in this composition $Li^+$ or $Zn^{2+}$ cations make up 92.1 at. % of the non-proton extra-framework cations that are present per unit cell, and so this composition would meet a requirement that "at least 90% of the non-proton extra-framework cations that are present are $Li^+$ or $Zn^{2+}$ cations."

As used herein, all references to a zeolite using the designation RHO(X.X), where "X.X" is number, indicate a RHO zeolite having a silicon to aluminum ratio that is X.X (rounded to one decimal place). Thus, as noted supra, the known prior art mixed-cation RHO zeolite $Li_{7.1}Na_{1.93}Cs_{0.3}Al_{11.7}Si_{36.3}O_{96}$, which has a silicon to aluminum (Si/Al) ratio of 36.3/11.7=3.1025641, can also be referred to as $Li_{7.1}Na_{1.93}Cs_{0.3}RHO(3.1)$.

Unless otherwise indicated, all references to the unit cell axis length of a RHO zeolite indicate the unit cell axis length of the RHO zeolite when dehydrated and as measured and determined using X-ray diffraction (XRD). Further details of suitable XRD techniques and methods of determining the unit cell length axis of a RHO zeolite from the resulting XRD data are provided in the Experimental section, infra. For example, the unit cell axis length of a dehydrated sample of RHO zeolite can be determined by Rietveld refinement against the XRD data. Unless otherwise indicated, all references herein to unit cell axis lengths of a RHO zeolite indicate the unit cell axis length rounded to two decimal places.

As is well known, pressure swing adsorption (PSA) processes comprise an adsorption step which the feed stream containing the substance or substances to be adsorbed is passed through a bed of adsorbent at an elevated pressure, and a desorption step in which substances adsorbed in the previous adsorption step are desorbed from the bed at reduced pressure. In this context, the terms "elevated pressure" and "reduced pressure" refer only to the relative pressures in the bed during the two steps, i.e. the pressure during the adsorption step is elevated relative to the pressure during the desorption step but may otherwise be of any suitable pressure for carrying out the adsorption step, and the pressure during the desorption step is reduced relative to the pressure during the adsorption step but may otherwise be of any suitable pressure for carrying out the desorption steps. Suitable operating pressures and cycles for carrying out PSA are well known to those of ordinary skill in the art.

Disclosed herein are processes, and in particular PSA processes, of adsorbing oxygen from a feed stream containing oxygen, comprising passing the feed stream through a bed of an adsorbent selective for oxygen so as to adsorb oxygen from the feed stream, thereby producing a product stream depleted in oxygen, wherein the adsorbent comprises a RHO zeolite having a Si/Al ratio of from 3.2 to 4.5 and containing non-proton extra-framework cations, wherein the size, number and charge of the extra-framework cations that are present in the zeolite are such that 1.8 or fewer non-proton extra-framework cations per unit cell are required to occupy 8-ring sites, and wherein the zeolite has a unit cell axis length of from 14.23 Å to 14.55 Å.

Said RHO zeolites used in these processes demonstrate improved productivity, capacity, and/or regenerative properties at ambient (0 to 50° C.) and sub-ambient (<0° C.) temperatures. The present inventors have observed that, surprisingly, said RHO zeolites are suitable for rapid $O_2$ separation from Ar. The compositions are well suited for use in pressure swing adsorption techniques at ambient (0° C. to 50° C.) temperatures and it is believed that they would be effective at cold temperatures in the process described by U.S. patent application Ser. No. 15/049,704, METHOD FOR ARGON PRODUCTION VIA COLD PRESSURE SWING ADSORPTION (U.S. Pat. No. 9,708,188). In addition to their use in such processes, these and other RHO zeolites described herein may in some cases be suitable for Ar or $N_2$ PSA applications as well as methane upgrading, i.e., $CO_2$ removal from methane, applications.

Without intending to be bound by theory, it is believed that the RHO zeolites described herein achieve their desirable adsorption properties based on the nature of the 8-ring openings of these structures, through which gas molecules must pass to enter the RHO cages. In RHO, these rings are very flexible and can undergo significant distortion from circular to highly elliptical depending on extra framework cation site and type. Optimization of the extra framework cation sites, as well as the generation of elliptical 8-ring openings, are likely important factors in allowing the very rapid uptake of elongated oxygen molecules versus the slow uptake of spherical argon atoms.

Extra-framework cations in RHO zeolites can occupy at least one of three different sites in the unit cell cage. It is known that small cations, comparable in size to $Li_+$, i.e. those with a 6-coordinate cation radius as defined by Shannon (R. D. Shannon, *Acta Cryst.* 1976, A32, 751-767.) of 0.8 Å and below, can reside in 6-ring openings within the unit cell cage. There are 8 of these sites per RHO unit cell in any RHO composition with Si/Al of 5 or less. Smaller cations, 0.8 Å and below, can also occupy one of 12 sites at the center of individual 8-ring openings, and will be required to occupy those sites if all eight of the 6-ring sites are already filled. In addition to $Li^+$, examples of cations with 6-coordinate Shannon cationic radii smaller than 0.8 Å are $Mg^{2+}$ and divalent cations of the first-row transition series and more specifically $Mn^{2+}$, $Fe^{2+}$, $Co^{2+}$, $Ni^{2+}$, $Cu^{2+}$, and $Zn^{2+}$.

Intermediate size cations, i.e. those with a 6-coordinate Shannon cation radius from 0.8 to approximately 1.3 Å, can reside in one of 12 sites at the center of individual 8-ring openings and, in some cases, at one of 6 sites at the center of two 8-ring windows in the RHO unit cell. They are unable to fit in the 6-ring sites under ambient conditions, i.e. between 0 and 50° C. As an example, in U.S. Pat. No. 5,944,876, Corbin teaches of fully and partially $Cd^{2+}$ exchanged RHO zeolites, with Si/Al>3, including RHO compositions with at least 1 $Cd^{2+}$ cation per unit cell, with an assortment of other cations. Because of the size of the $Cd^{2+}$ cations these compositions require at least one cation, namely the $Cd^{2+}$ cation to reside in an 8-ring position.

The largest cations with a 6-coordinate Shannon cation radius larger than 1.3 Å, including $Cs^+$, which is required in the RHO crystallization process, occupy one of 6 sites at the center of two 8-ring windows in the RHO unit cell.

Small, monovalent cations, such as $Li^{30}$ are very electropositive and have been shown to cause large elliptical distortions in the 8-ring openings. Larger, divalent cations, such as $Ca^{2+}$ and $Cd^{2+}$ are also very electropositive and have been shown to cause even larger distortions of the 8-ring openings. In contrast, very small protons, or H$^+$ cations, cause no distortion of the RHO 8-rings, presumably because they directly bind to one of the zeolite oxygen atoms.

It has been suggested that while the larger Ca$^{2+}$ cations distort and block 8-ring openings, thereby inhibiting gas uptake, the smaller Li$^+$ cations, while still distorting the 8-rings, could leave enough of the 8-rings open to still permit some gas uptake. This concept was demonstrated, in part, by Corbin in U.S. Pat. No. 7,169,212, who showed that Li$_{7.1}$Na$_{1.93}$Cs$_{0.3}$RHO(3.1) could adsorb O$_2$ with effective exclusion of N$_2$. Unfortunately, the O$_2$ uptake rate of this material is extremely slow and is too slow for PSA applications. While no detailed structural data with cation positions is presented for this material, one can infer that at least 2.23 of the non-proton cations must occupy 8-ring blocking positions. The sodium and cesium cations are too large to fit in 6-rings and fill a total of 2.23 of the 8-ring positions per unit cell. The full cation balance is not reported for this material, and it is possible that additional non-proton cations are forced to reside in the 8-rings. If the cation balance was completed with any monovalent cations other than protons, as many as 3.7 cations would be required to reside in 8-rings. Regardless, the O$_2$ uptake rate reported is very slow and is consistent with at least 2.2 non-proton cations being forced to reside in the 8-rings of this composition, based on other comparative examples.

As a comparative example Li$_{9.5}$Na$_{1.6}$Cs$_{0.3}$RHO(3.2) was prepared, which nominally contains the same number of cations/unit cell as the material reported by Corbin, and was targeted to achieve the same number of Na$^+$ and Cs$^+$ cations. In this composition, one can infer that at least 3.4 of the cations must occupy 8-ring blocking positions. The sodium and cesium cations are too large to fit in 6-rings and fill a total of 1.9 of the 8-ring positions per unit cell. Of the 9.5 Li$^+$ cations per unit cell, once all 8 of the 6-ring positions are filled, 1.5 must go in 8-ring positions, making a total of 3.4 cations in 8-ring positions in this unit cell. This material showed nitrogen exclusion behavior like the above RHO composition of Corbin, and the oxygen uptake rate observed was exceedingly slow.

For a RHO material with Si/Al of 3.2, even when all of the cations are small enough to fit in 6 ring windows, if they are monovalent, such as Li$^+$, 3.4 of them would be required to reside in 8-ring windows, based on the charge balance required for a RHO(3.2) material. In a comparative example, described infra, fully lithium exchanged Li$_{11.4}$RHO(3.2) has been demonstrated to show good kinetic selectivity for oxygen over nitrogen and argon, but the oxygen uptake rate is still much slower than CMS and indeed is comparable to the material described by Corbin.

In other comparative examples, described infra, it has been shown that fully proton exchanged H$_{10.7}$RHO(3.5) and H$_{9.2}$RHO(4.2) adsorb O$_2$, N$_2$, and Ar very rapidly, but non-selectively, consistent with an absence of distortion in the 8-ring windows.

For RHO compositions with Si/Al between 3.2 and 4.5, the extent of aluminum substitution, and consequently the formal negative charge which must be balanced, ranges from 11.4 to 8.7. In the RHO zeolites used according to the present invention, the non-proton extra-framework cations are chosen such that 1.8 or fewer non-proton extra-framework cations, and most preferably 1 or fewer non-proton extra-framework cations are forced to reside, by virtue of their size, charge, and/or the total number of extra-framework cations, in 8-ring blocking sites. For example, as previously discussed, Li$_{11.4}$RHO(3.2) is forced to have at least 3.4 Li$^+$ cations in 8-ring blocking positions, once all 6-ring positions are filled, and thus is not suitable for use in the present invention. Conversely, the novel RHO zeolite Zn$_{5.7}$RHO(3.2) satisfies the charge balance of RHO(3.2) with potentially no cations in 8-ring windows, i.e., all cations are small enough to fit in 6-rings (the Shannon 6-coordinate cation radius for Zn$^{2+}$ is 0.74 Å), and there are enough 6-rings to hold all of the cations. In actuality, some of the Zn$^{2+}$ cations are observed to reside in 8-rings in the Zn$_{5.7}$RHO(3.2) unit cell but, by virtue of their size and number, there is the potential for them to move between the 6 and 8 rings. The Zn$_{5.7}$RHO(3.2) composition shows excellent kinetic selectivity for O$_2$ vs. N$_2$ and O$_2$ vs. Ar, and its O$_2$ D/r$^2$ is 900 times faster than that of Li$_{11.4}$RHO(3.2), 915 times faster than that of Li$_{9.5}$Na$_{1.6}$Cs$_{0.3}$RHO(3.2), and 10 times faster than an example CMS material. This composition as well as other new RHO zeolite compositions described herein, including Zn$_{4.1}$Li$_{1.1}$Na$_{0.5}$RHO(3.9) and Zn$_{4.9}$RHO(3.9), also show excellent equilibrium selectivity for N$_2$ over argon, making them potentially useful for removal of trace N$_2$ from argon. The larger unit cell composition Zn$_{4.1}$Na$_{1.6}$RHO(3.9) also shows excellent equilibrium selectivity for N$_2$ over argon, but shows lower kinetic selectivity for O$_2$ vs. Ar than some of the compositions of this invention.

In addition to choosing small, divalent cations, the number of distorting cations required to be in 8-ring windows can also be decreased by increasing the Si/Al ratio. As the Si/Al ratio of RHO goes from 3.2 to 3.9 to 4.2, LiRHO compositions go from Li$_{11.4}$RHO(3.2), to Li$_{9.8}$RHO(3.9), to Li$_{9.2}$RHO(4.2). In the present examples, the composition Li$_{9.8}$RHO(3.9) was found to contain low levels of sodium, and actually has the composition Li$_{9.0}$Na$_{0.8}$RHO(3.9) by ICP analysis. Required 8-ring occupancy in this series goes from 3.4 to 1.8 to 1.2. O$_2$ D/r$^2$ increases from 1 to 67 to 2400 relative to that of Li$_{11.4}$RHO(3.2), while O$_2$ vs. N$_2$ and Ar kinetic selectivities remain high for all. For oxygen removal, both the Li$_{9.0}$Na$_{0.8}$RHO(3.9) (nominally Li$_{9.8}$RHO(3.9)) composition and the Li$_{9.2}$RHO(4.2) composition are potentially useful. Both show very high kinetic selectivity for O$_2$ vs. Ar, while the first composition has an O$_2$ D/r$^2$ uptake rate comparable to that of CMS and the second composition has an O$_2$ D/r$^2$ uptake rate 27 times faster than CMS.

Figure 2:
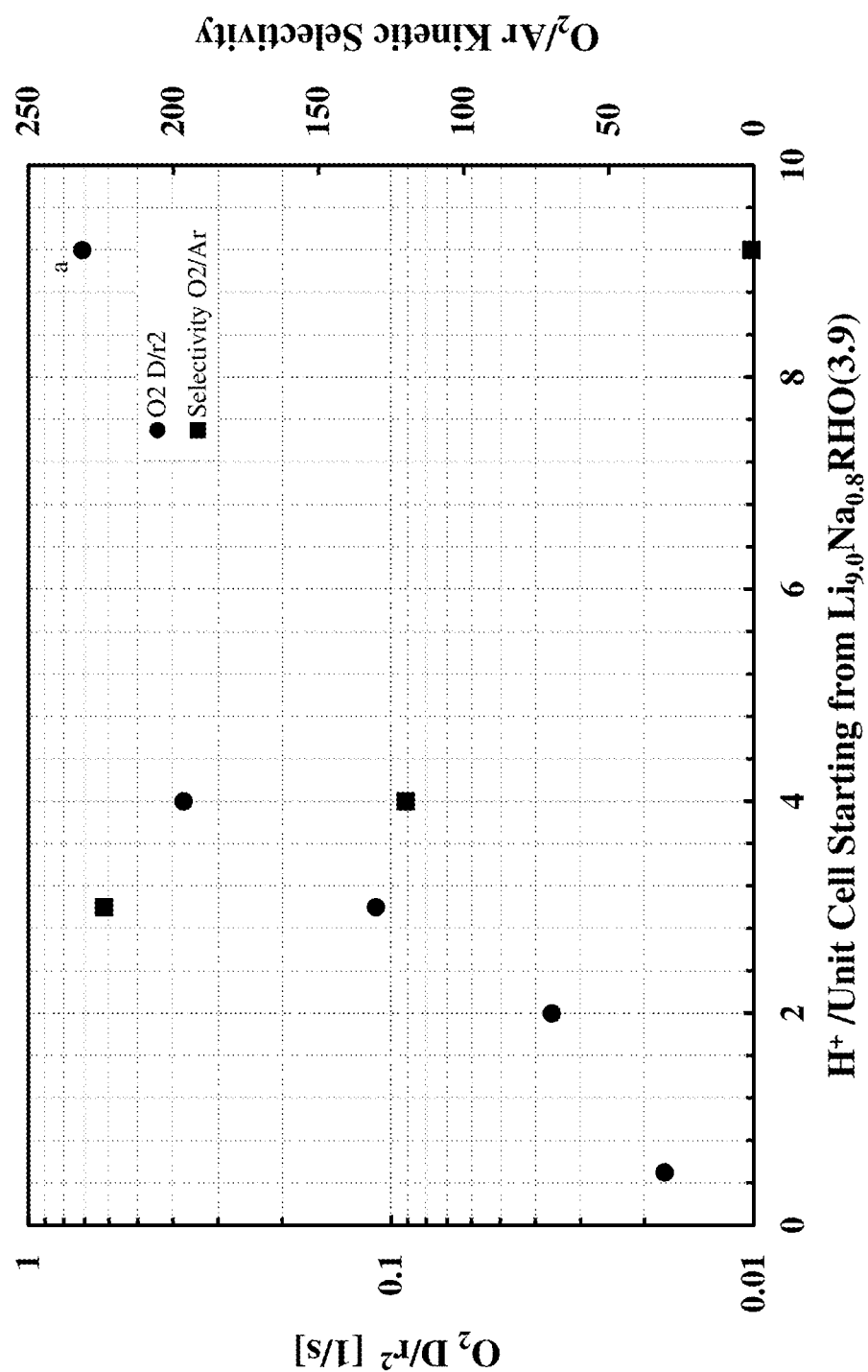
FIG. 2 is a graph of both O$_2$ uptake rate and kinetic selectivity of O$_2$ vs. Ar plotted against the level of proton exchange in Li$_{9.0}$Na$_{0.8}$RHO(3.9). $^a$During full H$^+$ exchange of RHO(3.9) some framework de-alumination occurs resulting in a Si/Al of 4.2, or H$_{9.2}$RHO(4.2).

A third way to reduce the number of distorting cations required to occupy blocking 8-ring positions involves the substitution of blocking cations with protons, which presumably do not distort the 8-rings. Corbin in U.S. Pat. No. 7,169,212, mentions the possibility that mixed cation RHO materials with partial exchange of H$^+$ (e.g. H,CsRHO) could be prepared which would "give at least some of the desired distortion and smaller pore size," but no specific compositions were reported. Recently, Paul A. Wright and co-workers (J. Am. Chem. Soc. 2012, 134, 17628) described the preparation of mixed Li$_{9.8-x}$H$_x$RHO(3.9), but no adsorption data was reported. In the present application, a number of Li$_{9.8-x}$H$_x$RHO(3.9) compositions have been prepared, and are described infra, in which the number of non-proton cations forced to reside in 8-ring blocking sites have been lowered to 1 or fewer. Unless otherwise indicated, all adsorption data, both equilibrium and kinetic, was measured at 30° C. As shown in FIGS. 1 and 2, substitution of Li$^+$ cations in Li$_{9.0}$Na$_{0.8}$RHO(3.9) with varying numbers of protons leads to a dramatic increase in O$_2$ D/r$^2$ (up to 40 times higher than Li$_{9.0}$Na$_{0.8}$RHO(3.9)). Surprisingly, good O$_2$ vs. N$_2$ and O$_2$ vs. Ar kinetic selectivity is maintained to up to a composition of Li$_{5.8}$H$_4$RHO(3.9) and H$_6$Li$_{5.4}$RHO(3.2). Results of Ar PSA simulations on Li$_{6.8}$H$_3$RHO(3.9)

shown in Table 4 and Example 11, show a large improvement in Ar recovery and productivity over CMS materials, though not quite as high as the novel composition, $Li_{5.2}Zn_{1.8}H_{0.5}Na_{0.5}RHO(3.9)$.

Figure 3:
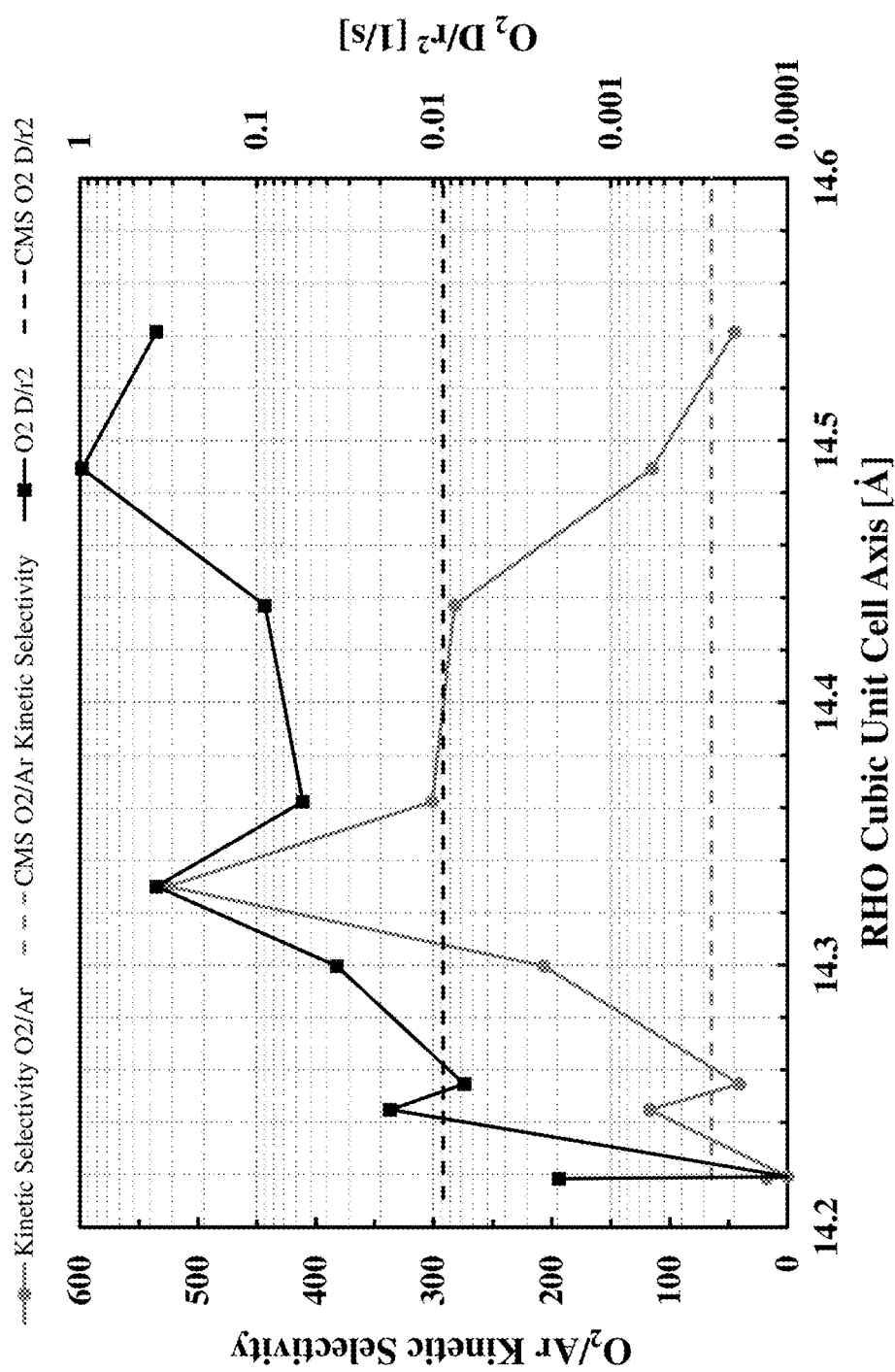
FIG. 3 is a graph showing the variation in O$_2$ D/r$^2$ and O$_2$/Ar kinetic selectivity with change in RHO unit cell axis for selected RHO compositions.
Figure 11:
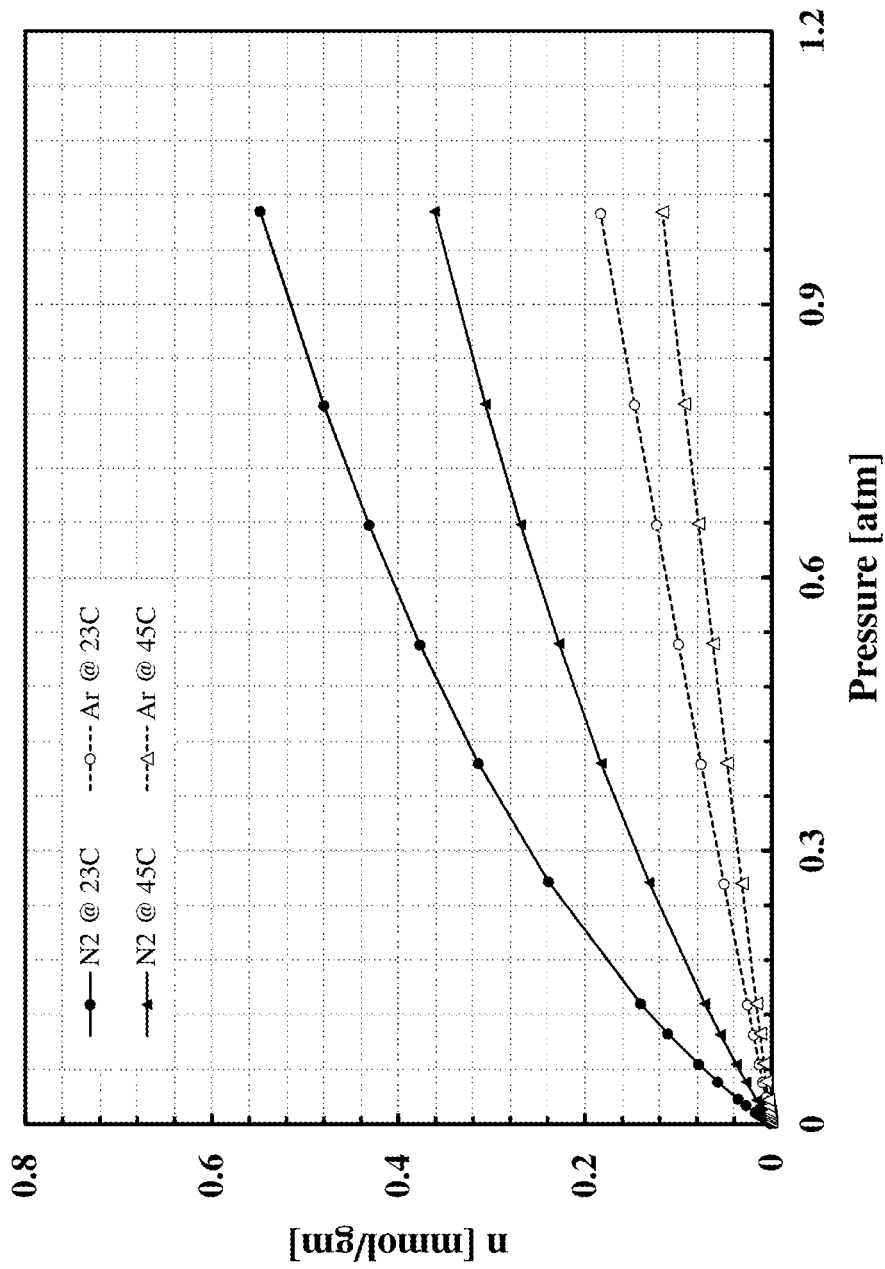
FIG. 11 is a graph showing the isotherms of N$_2$ and Ar at 23 and 45° C. on Zn$_{4.1}$Na$_{1.6}$RHO(3.9).

A comparison of the unit cell axis data in Table 3 and FIG. 3 with the $O_2$ $D/r^2$ and $O_2/Ar$ kinetic selectivity data show the optimal RHO materials for rapid separation of $O_2$ from Ar. These are RHO compositions, having 1.8 or fewer and preferably 1.6 or fewer and most preferably 1.0 or fewer non-proton extra-framework cations per unit cell, which, by virtue of their size, charge and/or number, are required to reside in 8-ring sites; and having a cubic or approximately cubic unit cell defined by a unit cell axis between 14.23 and 14.55 Å, more preferably between 14.23 and 14.50 Å, and most preferably between 14.30 and 14.45 Å. Those with a smaller unit cell axis, including $Li_{11.4}RHO(3.2)$, show slower $O_2$ uptake than typical CMS materials, while those with larger unit cell axes, like $H_{9.2}RHO(4.2)$, show lower kinetic selectivity for $O_2$ over Ar than CMS materials. Also described herein are new RHO zeolite compositions with larger unit cell axes, from 14.45 Å to 14.85 Å, that additionally or alternatively show potential for the rapid separation of trace $N_2$ from Ar by an equilibrium separation process. A comparison of the unit cell and uptake data in Table 3 shows that both $Zn_{4.9}RHO(3.9)$ (with unit cell axis=14.54 Å) and $Zn_{4.1}Li_{1.1}Na_{0.5}RHO(3.9)$ (unit cell axis=14.49 Å) rapidly adsorb $N_2$ with equilibrium selectivity of $N_2$ vs. Ar of approximately 3. FIG. 11 shows the isotherm data for $Zn_{4.1}Na_{1.6}RHO(3.9)$ confirming high $N_2$ vs Ar equilibrium selectivity over a range of pressures and temperatures. It is likely that these compositions would also be useful for other rapid separations including that of $CO_2$ from methane.

Figure 4A:
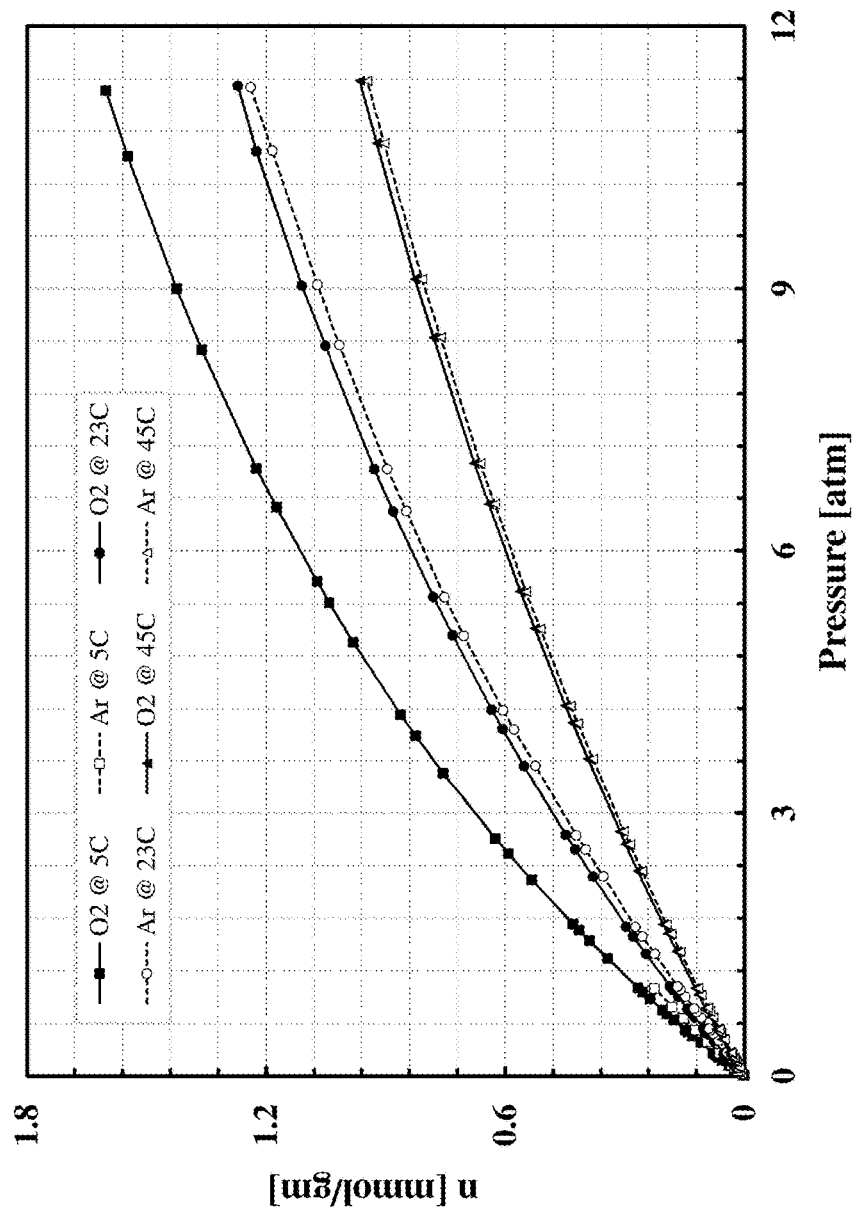
FIG. 4a is a graph showing isotherm data measured up to 10 atm for O$_2$ and Ar on Li$_{5.2}$Zn$_{1.8}$H$_{0.5}$Na$_{0.5}$RHO(3.9) at three temperatures.
Figure 4B:
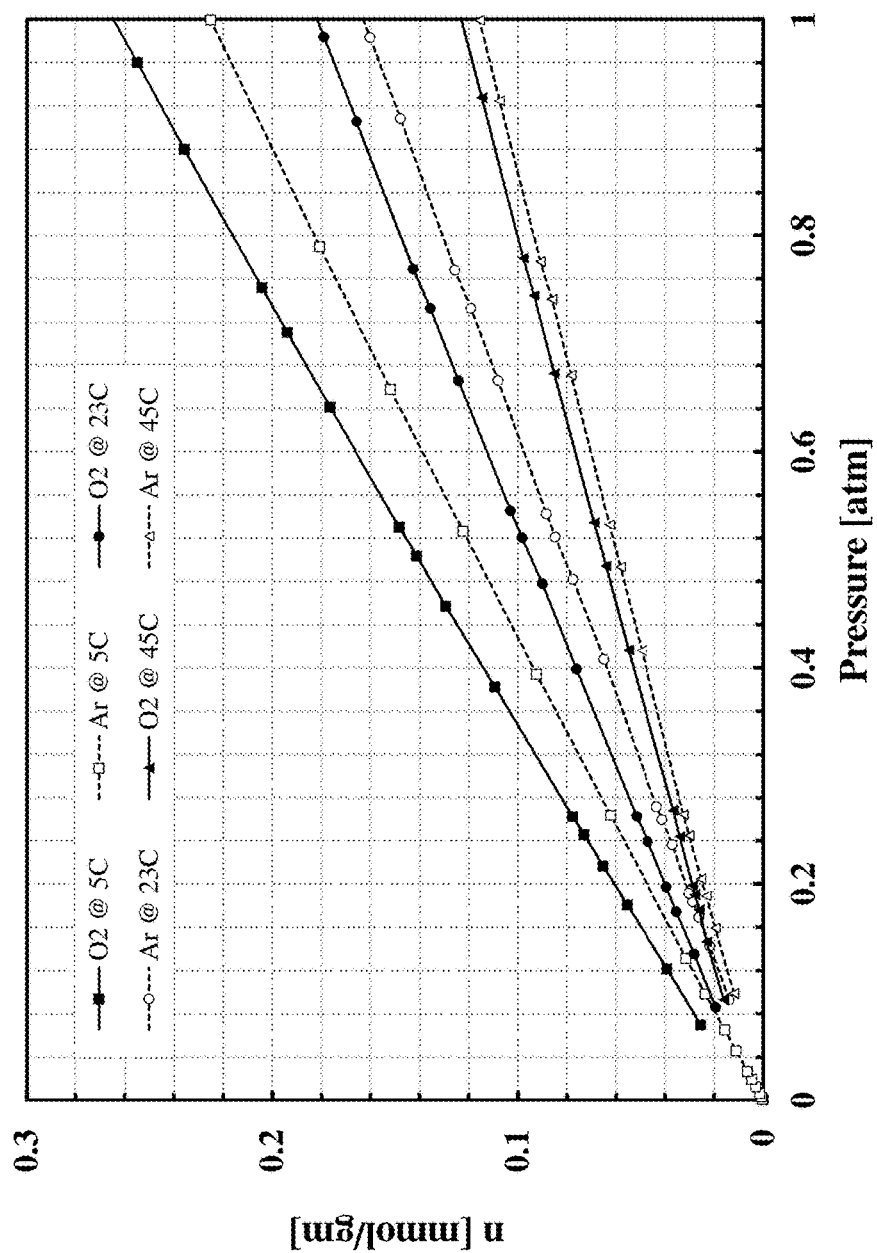
FIG. 4b is a graph showing isotherm data measured up to 1 atm for O$_2$ and Ar on Li$_{5.2}$Zn$_{1.8}$H$_{0.5}$Na$_{0.5}$RHO(3.9) at three temperatures.

A number of the RHO zeolite compositions described herein provide high kinetic selectivity for $O_2$ versus Ar and $O_2$ versus $N_2$ adsorption at ambient temperatures. As shown in FIG. 4b, an $O_2$ versus Ar equilibrium selectivity close to 1 is observed on $Li_{5.2}Zn_{1.8}H_{0.5}Na_{0.5}RHO(3.9)$ at 23° C. Effective equilibrium selectivity for $O_2$ versus Ar is observed as the adsorption temperature is dropped below 23° C., which is likely associated with temperature dependent contraction of the RHO 8 ring windows as well as reduced vibration of the rings. Thus, these RHO materials appear to have ideal properties for removal of $O_2$ from argon containing streams.

Figure 5:
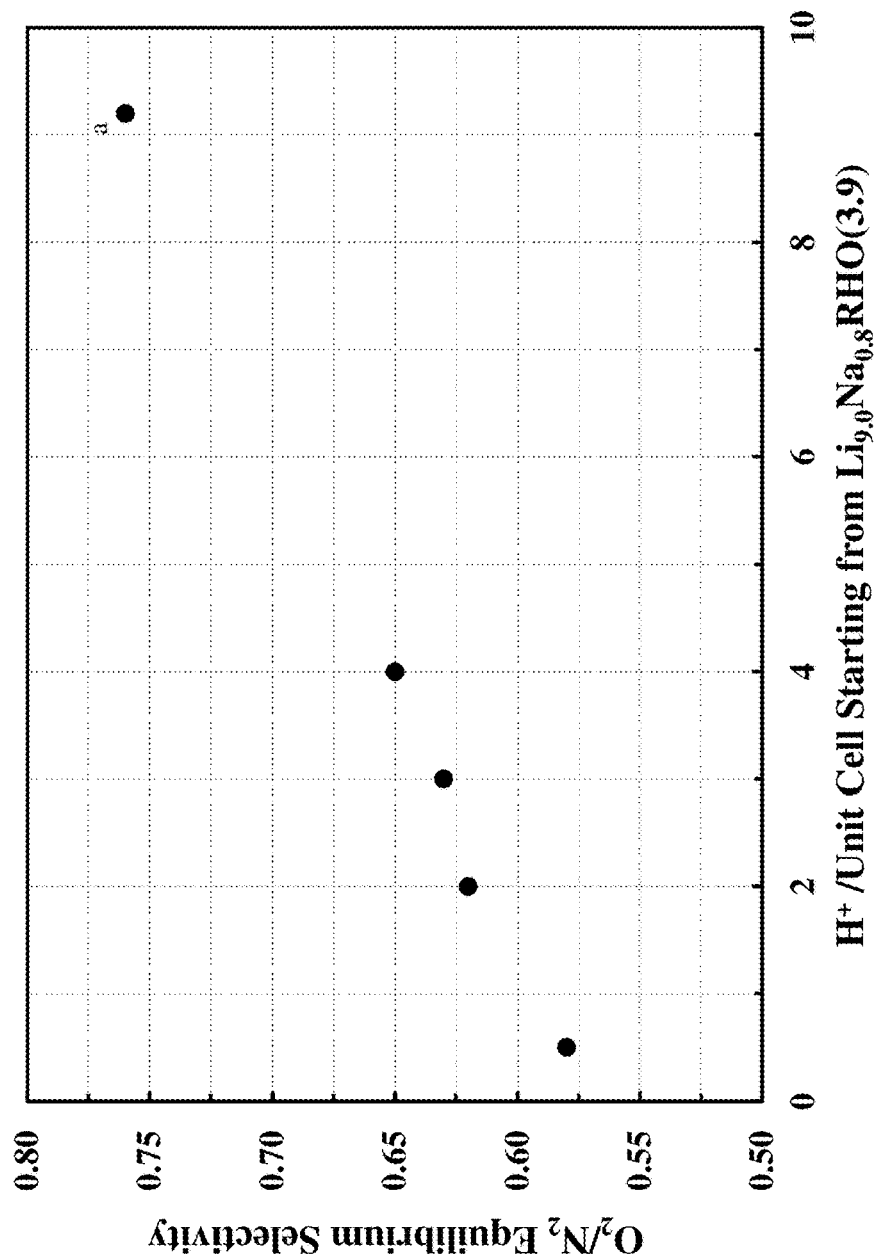
FIG. 5 is a graph of the O$_2$ vs. N$_2$ equilibrium selectivity plotted against the level of proton exchange starting from Li$_{9.0}$Na$_{0.8}$RHO(3.9). $^a$During full H$^+$ exchange of RHO(3.9) some framework de-alumination occurs resulting in a Si/Al of 4.2, or H$_{9.2}$RHO(4.2).

The $O_2$ vs. $N_2$ equilibrium selectivity of low-silica zeolites is typically less than 0.5, due to the stronger quadrupole interactions between $N_2$ and electropositive extra framework cations of the zeolite. The RHO zeolites also show this behavior, but as can be seen in FIG. 5, the $O_2$ vs. $N_2$ equilibrium selectivity can be significantly improved by increasing the number of protons exchanged for $Li^+$ in a $Li_{9.0}Na_{0.8}RHO(3.9)$ zeolite. Complete exchange to the fully protonated RHO increases the $O_2/N_2$ equilibrium selectivity to 0.76. Unfortunately, the lack of 8-ring distortion by these cations leads to negligible kinetic selectivity between $O_2$ and $N_2$. By balancing improved $O_2$ vs. $N_2$ equilibrium selectivity with high kinetic selectivity and rate, it appears that an optimum may in some instances be achieved on exchange of 3 to 4 protons (FIGS. 1 and 5).

Also disclosed herein are processes, and in particular PSA processes, of adsorbing oxygen and nitrogen from a feed stream comprising oxygen, nitrogen, and argon, comprising passing the feed stream through one or more beds of adsorbent comprising a first adsorbent selective for nitrogen to adsorb nitrogen from the feed stream and a second adsorbent selective for oxygen to adsorb oxygen from the feed stream, thereby producing a product stream enriched in argon and depleted in oxygen and nitrogen. In said processes, the second adsorbent preferably comprises a RHO zeolite as described above as being preferred for use in processes for adsorbing oxygen from a feed stream containing oxygen. The first adsorbent preferably has a Henry's law constant for nitrogen of from 0.5 to 3.0 mmole/gm/bara at 37.78° C. In certain embodiments, the first adsorbent may also comprise a RHO zeolite of the type described above as being preferred in the context of processes for adsorbing oxygen, except that in the case of the first adsorbent said RHO zeolite has a unit cell axis of from 14.45 Å to 14.85 Å (instead of having a unit cell axis of from 14.23 Å to 14.55 Å as is preferred for the RHO zeolites used for the selective adsorption of oxygen).

Several of the new RHO zeolite compositions described herein that have unit cell axis from 14.45 Å to 14.85 Å show potential for the rapid removal of trace $N_2$ from Ar by an equilibrium separation process. Both $Zn_{4.9}RHO(3.9)$ (with unit cell axis=14.54 Å) and $Zn_{4.1}Li_{1.1}Na_{0.5}RHO(3.9)$ (unit cell axis=14.49 Å) show rapid uptake of $N_2$ with equilibrium selectivity of $N_2$ vs. Ar of 3.

Also described herein are new methods of making RHO zeolite compositions, including the new RHO zeolite compositions described herein.

In particular, described herein is a convenient method of preparing the RHO zeolite compositions using reduced levels of templating agent. As previously described by Chatelain in (Microporous Materials, 1995, 4, 231), RHO (3.9) can be readily prepared using 18-crown-6 as a templating or structure directing agent. While effective, 18-crown-6 is expensive, and the literature preparation uses this reagent in approximately stoichiometric amounts with CsOH. The present application describes a process whereby seeding the RHO preparation gel composition with approximately 10 wt. % of $Na_{6.8}Cs_{3.0}RHO(3.9)$ (relative to the amount of RHO(3.9) product produced) allows the quantity of 18-crown-6 used to be cut by 80%. Use of small amounts of $Na_{8.4}Cs_{3.0}RHO(3.2)$ seed material also allows RHO(3.2) to be prepared much more reliably. While as synthesized $Na_{8.4}Cs_{3.0}RHO(3.2)$ and $Na_{6.8}Cs_{3.0}RHO(3.9)$ are used in seeding the targeted RHO preparations, it is believed that any RHO material with the target Si/Al would be effective.

The present inventors have also observed that, when preparing mixed cation RHO zeolites, particularly those containing $Li^+$ and $Zn^{2+}$ cations, the order of cation exchange significantly impacts the loading of $Zn^{2+}$ achievable in the zeolite. This can be seen from the exchange data in Table 1. When starting with $Li_{11.4}RHO(3.2)$, a single Zn-exchange with >100:1 molar ratio of 2M $Zn(NO_3)_2$ exchange solution concentration to zeolite concentration leads to the replacement of only 2.4 of the 11.4 $Li^+$ cations. A second exchange under the same conditions replaces only one additional $Li^+$ cation. Complete replacement of $Li^+$ with $Zn^{2+}$ is apparently a very slow and difficult process, perhaps because most of the $Li^+$ cations must be exchanged from very small 6-ring sites. In contrast exchanging $Zn^{2+}$ into RHO appears to proceed much more easily starting from the sodium exchanged RHO. Only 3 exchanges, using only a 40:1 molar ratio of 1.5 M $Zn(NO_3)_2$ exchange solution concentration to zeolite concentration, are required to fully load the RHO structure with $Zn^{2+}$ cations. Back-exchange of the resulting $Zn_{5.7}RHO(3.2)$ or $Zn_{4.9}RHO(3.9)$ composition with $Li^+$ appears to proceed smoothly.

EXAMPLES

The compositions described herein in the following examples were characterized in the following manner. In addition to measuring their adsorption properties, novel zeolite compositions were characterized by X-ray diffraction, $^{29}$Si NMR, by elemental analysis using ICP-OES, and by scanning electron microscopy (SEM).

Powder x-ray diffraction (XRD) patterns of hydrated and dehydrated samples were measured in Debye-Scherrer geometry on a Stoe STAD i/p diffractometer with monochromated Cu K$\alpha_1$ X-rays ($\lambda$=1.54056 Å). In addition, laboratory powder X-ray diffraction for Rietveld refinement was performed on samples in quartz glass capillaries that had been activated at the glass line at 623 K for 10 hours and sealed using a blow-torch. The unit cell axis length and the number, and position of extra framework cations for Li,M-Rho samples were determined by Rietveld refinement against the laboratory PXRD data, using the GSAS suite of programs.

Solid state $^{29}$Si NMR spectra were obtained at ambient temperature on a Bruker Avance II 300 FT-NMR spectrometer, equipped with a 7 mm MAS probe. The acquisition was carried out using one pulse employing an 8-second recycle delay while the rotor was spun at 5000 Hz at magic angle. Peak deconvolution was performed using GRAMS/32 AI (version 6.00) software. Mixed Gaussian/Lorentzian line shapes were employed. From the relative peak areas, the Si/Al ratio was calculated using Equation 1.

$$\frac{Si}{Al} = \frac{\sum_{n=0}^{4} I_{Si_{(nAl)}}}{\sum_{n=0}^{4} 0.25n\, I_{Si_{(nAl)}}}$$

where: Si/Al=Silicon to Aluminum ratio, I=Relative area of NMR peak.

$Si_{(nAl)}$=Silicon with n aluminum atoms as nearest neighbor bound through oxygen.

n=Number of nearest aluminum atoms represented by the NMR peak.

The cation exchange level was determined by elemental analysis using established methods, which involved either direct analysis on the solid zeolite by energy dispersive spectroscopy (EDX) or dissolution of the solid and subsequent analysis of the solution using inductively coupled plasma optical emission spectroscopy (ICP-OES).

A Perkin Elmer 3000DV Inductively Coupled Plasma Optical Emission Spectrometer was used for the sample analysis.

SEM analyses were performed using a Hitachi S-4800 field-emission SEM operated at 2 kV accelerating voltage.

EDX analysis on all samples was performed in a JEOL JSM 5600 SEM, with an Oxford INCA Energy 200 EDX analyser.

Example 1: Synthesis of $Na_{8.4}Cs_{3.0}RHO(3.2)$

The modified RHO synthesis method described by Corbin et al. in U.S. Pat. No. 7,169,212, was used to prepare $Na_{8.4}Cs_{3.0}Al_{11.4}Si_{36.6}O_{96}$, or $Na_{8.4}Cs_{3.0}RHO(3.2)$, a RHO zeolite composition with nominal Si/Al=3.2. The purity of the crystalline material was determined by XRD and Si/Al by $^{29}$Si NMR. Both matched reported data for the hydrated form of RHO(3.2) zeolites. SEM images show an average particle size of ~2.5 m.

Example 2: Synthesis of $Na_{6.8}Cs_{3.0}RHO(3.9)$

RHO(3.9) was prepared by the method of Chatelain et al. (*Microporous Materials*, 1995, 4, 231). Crystallization and isolation followed by calcination in air at 550° C. gives $Na_{6.8}Cs_{3.0}Al_{9.8}Si_{38.2}O_{96}$ or $Na_{6.8}Cs_{3.0}RHO(3.9)$. The purity of the crystalline material was determined by XRD and the Si/Al ratio by $^{29}$Si NMR. Results from both methods matched reported data for the hydrated form of RHO(3.9) zeolites. SEM images show an average particle size of ~1 µm.

Example 3: Synthesis of RHO Zeolites with Reduced Levels of Templating Agent $Na_{8.4}Cs_{3.0}RHO(3.2)$ Aluminum isopropoxide (3.67 g) was dissolved in aqueous NaOH solution (50 weight %, 4.5 g) at 100° C. and left to cool to 25° C. Aqueous CsOH solution (50 weight %, 2.7 g) was then added with stirring, followed by 18-crown-6 (0.27 g). Next, $Na_{8.4}Cs_{3.0}RHO(3.2)$ was added as a seed material (0.6 g), followed by colloidal silica (Ludox 30, 20 g), and then, distilled water (0.35 g). Once homogeneous, the gel was aged at 25° C. for 4 days before crystallizing in a polypropylene bottle at 90° C. for 5 days under static conditions. The resulting white solid was filtered and washed before being dried at 90° C. overnight. The product was placed in a ceramic dish and slowly heated in a Fisher Scientific muffle furnace under 10 L/min ambient air purge to 300° C. at 0.4° C./min, and then heated to 550° C. at 1° C./min. Calcination of the product continued under 10 L/min ambient air purge at 550° C. for 24 hours. Approximately 6 g of pure RHO(3.2) product was obtained.

$Na_{6.8}Cs_{3.0}RHO(3.9)$

NaOH (0.59 g) and 18-crown-6 (0.27 g) were dissolved in CsOH solution (50 weight %, 1.8 g) and distilled water (0.78 g) before adding sodium aluminate (1.82 g) and stirring until homogenous. $Na_{6.8}Cs_{3.0}RHO(3.9)$ was added as seed material (0.6 g), followed by colloidal silica (Ludox 40, 15 g), and the mixture was stirred until homogenous. The gel was aged at 25° C. for 4 days before crystallizing in a polypropylene bottle at 90° C. for 5 days under static conditions. The resulting white solid was filtered and washed before being dried at 90° C. overnight. The product was placed in a ceramic dish and slowly heated in a Fisher Scientific muffle furnace under 10 L/min ambient air purge to 300° C. at 0.4° C./min, and then heated to 550° C. at 1° C./min. Calcination of the product continued under 10 L/min ambient air purge at 550° C. for 24 hours. Approximately 6 g of pure RHO(3.9) was obtained.

Example 4: Cation Exchange of RHO Zeolites

A variety of exchanged RHO(3.2 to 4.2) materials were prepared through ion exchange of the starting $Na_{5.4}Cs_{3.0}RHO(3.2)$ and $Na_{6.8}Cs_{3.0}RHO(3.9)$ from Examples 1 through 3, as well as $H_{9.2}RHO(4.2)$ from Example 6. Ammonium exchanged RHO samples were prepared by repeated (8 times) exchange with a 40-fold excess (mole % basis) of 1M ammonium chloride solution at 90° C. for at least 4 hrs. Sodium exchanged RHO materials were prepared from ammonium RHO zeolites through repeated (8 times) exchange with a 40-fold excess (mole % basis) of 1M sodium chloride solution at 90° C. for at least 4 hrs. The resulting sodium RHO could be readily exchanged with $Zn^{2+}$ or $Cu^{2+}$ using excess 1.5 M $Zn(NO_3)_2$ or 1.5M $Cu(NO_3)_2$ solutions at 90° C. Usually, two exchange steps were carried out to ensure complete exchange. Exchange of NaRHO to the LiRHO forms was more difficult and required at least 6 exchanges with 1M lithium chloride at 90° C. for at least 4 hrs. Exchange of LiRHO materials with $Zn^{2+}$ using $Zn(NO_3)_2$ solutions was very difficult to drive to completion and typically only exchanged 1 to 1.5 $Zn^{2+}$ cations per unit cell into the LiRHO composition. Final exchange compositions were determined by ICP-OES or EDX. Where the analysis gives a cation charge balance which is lower than that needed for the number of aluminum atoms/unit cell in a given RHO composition, the difference is assumed to be made up with protons, e.g. $Li_{5.2}Zn_{1.8}Na_{0.5}RHO(3.9)$ is adjusted to $Li_{5.2}Zn_{1.5}H_{0.5}Na_{0.5}RHO(3.9)$ to fully balance the charge of the 9.8 alumina centers/unit cell. A number of compositions and exchange conditions are shown in Table 1.

TABLE 1

Exchange Conditions for Pure and Mixed Cation RHO Samples

| Starting RHO | Salt Solution | Salt/zeolite (molar ratio) | Contact Time (hrs) | Exchange Temperature ° C. | Exchange Repeats | Product Composition |
|---|---|---|---|---|---|---|
| $Na_{8.4}Cs_{3.0}RHO(3.2)$ | 1M $NH_4Cl$ | 40 | >4 | 90 | 8 | $(NH_4)_{11.4}RHO(3.2)$ |
| $(NH_4)_{11.4}RHO(3.2)$ | 1M NaCl | 40 | >6 | 90 | 8 | $Na_{11.4}RHO(3.2)$ |
| $Na_{11.4}RHO(3.2)$ | 2M $Zn(NO_3)_2$ | 40 | >4 | 90 | 4 | $Zn_{5.7}RHO(3.2)$ |
| $Na_{11.4}RHO(3.2)$ | 1.5M $Cu(NO_3)_2$ | 30 | >4 | 90 | 4 | $Cu_{5.7}RHO(3.2)$ |
| $Na_{11.4}RHO(3.2)$ | 1M LiCl | 40 | >4 | 90 | 8 | $Li_{11.4}RHO(3.2)$ |
| $Na_{6.8}Cs_{3.0}RHO(3.9)$ | 1M $NH_4Cl$ | 40 | >4 | 90 | 8 | $(NH_4)_{9.8}RHO(3.9)$ |
| $(NH_4)_{9.8}RHO(3.9)$ | 1M NaCl | 40 | >6 | 90 | 8 | $Na_{9.8}RHO(3.9)$ |
| $(NH_4)_{9.8}RHO(3.9)$ | 2M $Zn(NO_3)_1$ | >100 | >4 | 60 | 4 | $Zn_{4.9}RHO(3.9)$ |
| $Na_{9.8}RHO(3.9)$ | 2M $Zn(NO_3)_2$ | 40 | >4 | 90 | 3 | $Zn_{4.1}Na_{1.6}RHO(3.9)$ |
| $Na_{9.8}RHO(3.9)$ | 1.5M $Cu(NO_3)_2$ | 30 | >4 | 90 | 4 | $Cu_{4.9}RHO(3.9)$ |
| $Na_{9.8}RHO(3.9)$ | 1M LiCl | 40 | >4 | 90 | 8 | $Li_{9.0}Na_{0.8}RHO(3.9)$ |
| $Li_{9.0}Na_{0.8}RHO(3.9)$ | 0.07M $NH_4Cl$ | 2 | >4 | 90 | 1 | $Li_{7.8}(NH_4)_2RHO(3.9)$ |
| $Li_{9.0}Na_{0.8}RHO(3.9)$ | 0.1M $NH_4Cl$ | 3 | 12 | 90 | 1 | $Li_{6.8}(NH_4)_3RHO(3.9)$ |
| $Li_{9.0}Na_{0.8}RHO(3.9)$ | 0.1M $NH_4Cl$ | 4 | 12 | 90 | 1 | $Li_{5.8}(NH_4)_4RHO(3.9)$ |
| $Li_{11.4}RHO(3.2)$ | 2M $Zn(NO_3)_2$ | >100 | >4 | 60 | 1 | $Li_{9.0}Zn_{1.2}RHO(3.2)$ |
| $Li_{9.0}Zn_{1.2}RHO(3.2)$ | 2M $Zn(NO_3)_2$ | >100 | >4 | 60 | 1 | $Li_{8.0}Zn_{1.7}RHO(3.2)$ |
| $Li_{9.2}H_{0.6}RHO(3.9)$ | 2M $Zn(NO_3)_2$ | >100 | 0.5 | 60 | 1 | $Li_{7.4}Zn_{1.2}RHO(3.9)$ |
| $Zn_{4.1}Na_{1.6}RHO(3.9)$ | 1M LiCl | 30 | 12 | 90 | 1 | $Zn_{4.1}Li_{1.1}Na_{0.5}RHO(3.9)$ |
| $Zn_{4.1}Li_{1.1}Na_{0.5}RHO(3.9)$ | 1M LiCl | 30 | 12 | 90 | 1 | $Li_{5.2}Zn_{1.8}H_{0.5}Na_{0.5}RHO(3.9)$ |

Example 5: Synthesis of $H_{10.7}RHO(3.5)$ $Na_{8.4}Cs_{3.0}RHO(3.2)$, from Example 1 was mixed with a 10-fold excess (mole % basis) of 1M ammonium chloride solution at 90° C. for at least 4 hrs. After mixing, the material was filtered. The ammonium chloride mixing (exchange) was repeated 8 times to fully convert the material to the ammonium exchanged RHO(3.2). After filtering, the material was rinsed 3 times with a 3-fold excess (weight % basis) of DI water and was dried overnight at 90° C. Typically, 75 g of the ammonium exchanged RHO(3.2) was placed in a ceramic dish and calcined in a purged Fisher Scientific muffle furnace. While the oven was purged with ambient air at 5 L/min, the material was heated at a rate at 0.8° C./min in air to 550° C. and calcined at this temperature for 24 hrs to prepare the proton exchanged RHO composition. Solid State $^{29}$Si NMR demonstrated that some de-alumination had occurred during calcination, leading to a Si/Al of 3.5. Calcination conditions and products from ammonium substituted RHO materials are shown in Table 2.

TABLE 2

Calcination of $NH_4$-substituted RHO materials

| Starting RHO | Calcination time (hrs) | Calcination Temperature ° C. | Product Composition |
|---|---|---|---|
| $(NH_4)_{11.4}RHO(3.2)$ | 24 | 550 | $H_{10.7}RHO(3.5)$ |
| $(NH_4)_{9.8}RHO(3.9)$ | 24 | 550 | $H_{9.2}RHO(4.2)$ |
| $Li_{7.8}(NH_4)_2RHO(3.9)$ | 24 | 550 | $Li_{7.8}H_2RHO(3.9)$ |
| $Li_{6.8}(NH_4)_3RHO(3.9)$ | 24 | 550 | $Li_{6.8}H_3RHO(3.9)$ |
| $Li_{5.8}(NH_4)_4RHO(3.9)$ | 24 | 550 | $Li_{5.8}H_4RHO(3.9)$ |

Example 6: Synthesis of $H_{9.2}RHO(4.2)$

RHO(3.9), $Na_{6.8}Cs_{3.0}RHO(3.9)$, from Example 2 was mixed with a 10-fold excess (mole % basis) of 1M ammonium chloride solution at 90° C. for at least 4 hrs. After mixing, the material was filtered. The ammonium chloride mixing (exchange) was repeated 8 times to fully convert the material to the ammonium exchanged RHO(3.9). After filtering, the material was rinsed 3 times with a 3-fold excess (wt. % basis) of DI water and was dried overnight at 90° C. Typically, 75 g of the ammonium exchanged RHO(3.9) was placed in a ceramic dish and calcined in a purged Fisher Scientific muffle furnace. While the oven was purged with ambient air at 5 L/min, the material was heated at a rate of 0.8° C./min in air to 550° C. and calcined at this temperature for 24 hrs to prepare the proton exchanged RHO composition, as shown in Table 2. Solid State $^{29}$Si NMR demonstrated that some de-alumination had occurred during calcination, leading to a Si/Al of 4.2.

Example 7: Synthesis of Mixed LiHRHO(3.9) and $Li_xHRHO(3.2)$ Zeolites $Li_{9.0}Na_{0.8}RHO(3.9)$, from Example 4, was mixed with 2:1, 3:1, and 4:1 stoichiometric ratios of 1M ammonium chloride solution at 90° C. for at least 4 hrs. After mixing, the material was filtered. After filtering, the material was rinsed 3 times with a 3-fold excess (wt. % basis) of DI water and was dried overnight at 90° C. Typically, 5-10 g of the partially ammonium exchanged RHO(3.9) samples were placed in a ceramic dish and calcined in a purged Fisher Scientific muffle furnace. While the oven was purged with ambient air at 5 L/min, the material was heated at a rate of 0.8° C./min in air to 550° C. and calcined at this temperature for 24 hrs to prepare the mixed $Li_7.8H_2RHO(3.9)$, $Li_{6.8}H_3RHO(3.9)$, and $Li_{5.8}H_4RHO(3.9)$ compositions, as shown in Table 2. The extent of ion exchange was confirmed by inductively coupled plasma optical emission spectroscopy (ICP-OES). An analogous process was carried out to prepare mixed Li,HRHO(3.2) zeolites, including $H_6Li_{5.4}RHO(3.2)$, after exchanging $Li_{11.4}RHO(3.2)$ from example 4 with a 6:1 stoichiometric ratio of 1M ammonium chloride solution at 90° C. for 4 hrs. While the resulting LiHRHO(3.2) composition is referred to in this application as $H_6Li_{5.4}RHO(3.2)$, based on the starting partially ammonium exchanged RHO(3.2); it is likely that some de-alumination to a slightly higher framework Si/Al ratio has occurred. ICP-OES results suggest the actual Si/Al may be closer to 3.5.

Example 8: Adsorption Rate Uptake Measurements

The mass transfer properties of the adsorbents were evaluated using a standard volumetric adsorption apparatus. The experiment consisted of exposing an adsorbent sample, which is initially at vacuum and 30° C., to a measured amount of $O_2$, $N_2$, or Ar at 760 Torr (101 kPa). The change in pressure was then followed as a function of time. The pressure time data is then subtracted from a similar pressure history using the same weight of quartz beads in the place of the adsorbent sample to obtain a plot of the amount of gas adsorbed as a function of time, also known as an uptake curve. From the initial slope of the uptake curve, a diffusion parameter for the test gas in units of inverse time ($sec^{-1}$) can be obtained. It is understood that the heat dissipation from adsorbent due to this step change in adsorbate loading during the kinetic measurement can affect the diffusion parameter when isothermal model is used in the calculation of the parameters. It is important to note that the heat of adsorptions for oxygen, nitrogen and argon on the RHO adsorbents considered here are significantly lower than most of the known zeolite adsorbents. Therefore, the diffusional parameter calculated under the assumption of isothermal behavior should be a reasonable estimate of the diffusion parameter.

A pseudo-equilibrium capacity can be defined for a given adsorbent sample over the timeframe of the experiment as follows. The pressure reduction of a gas over an adsorbent sample weighing 2.2 g is measured starting at 760 Torr (101 kPa) until the rate of pressure reduction is <1 Torr/min. A term Pmax is defined as the total pressure reduction or gas uptake over a 2.2 g sample of adsorbent after subtraction from the pressure reduction of the 2.2 g glass bead blank. The Pmax together with the system volume, thus defines a pseudo-equilibrium capacity. These Pmax values are given for various adsorbents in Table 3.

TABLE 3

Structural and Adsorption Data for Adsorbents of the Invention and Prior Art Materials.

| Adsorbent | RHO Unit Cell axis (Å) | Required minimum 8-ring occupancy of non-proton cations | $O_2$ $D/r^2$ | Particle size (μm) | Kinetic Selectivity $O_2/N_2$ | Kinetic Selectivity $O_2/Ar$ | $O_2$ Pmax (torr) | $N_2$ Pmax (torr) | Ar Pmax (torr) | $O_2$ Pmax*/ $N_2$ Pmax* | $O_2$ Pmax*/ Ar Pmax* |
|---|---|---|---|---|---|---|---|---|---|---|---|
| $Li_{9.5}Na_{1.6}Cs_{0.3}RHO(3.2)^d$ | 14.219 | 3.4 | 9.84E-05 | 2.5 | ND | 100 | 36 | ND | ND | >10 | >10 |
| $Li_{11.4}RHO(3.2)$ | 14.167 | 3.4 | 1.00E-04 | 2.5 | ND | ND | ND | ND | ND | ND | ND |
| $H_6Li_{5.4}RHO(3.2)^c$ | ND | 0 | 1.01E-01 | 2.5 | 3.70E+01 | >50 | 50 | 75 | 42 | 0.67 | 1.2 |
| $Li_{9.4}Ca_{1.0}RHO(3.2)$ | 14.155 | 2.4 | ND | 2.5 | ND | ND | ND | ND | ND | ND | ND |
| $Li_{9.0}Zn_{1.2}RHO(3.2)^c$ | 14.219 | 2.2 | 1.97E-03 | 2.5 | 17.2 | 17.8 | 43 | 37 | 5 | 1.15 | 8.2 |
| $Li_{9.0}K_{0.8}RHO(3.9)^c$ | 14.255 | 1.8 | 6.70E-03 | 1.0 | 37 | 41 | 47 | 53 | 14 | 0.89 | 3.3 |
| $Li_{9.0}Na_{0.8}RHO(3.9)^c$ | ND | 1.8 | 6.70E-03 | 1.0 | 30 | 100 | 53 | 65 | 5 | 0.82 | 11.6 |
| $Li_{8.3}Cs_{1.5}RHO(3.9)$ | 14.362 | 1.8 | 5.49E-02 | 1.0 | 39 | 301 | 46 | 81 | 38 | 0.57 | 1.2 |
| $Li_{8.0}Zn_{1.7}RHO(3.2)^c$ | ND | 1.7 | 3.14E-03 | 1.0 | 22.4 | 23 | 43 | 43 | 3 | 1 | 12.3 |
| $Zn_{4.1}Na_{1.6}RHO(3.9)$ | ND | 1.6 | 3.10E-01 | 1.0 | 13.5 | 35 | 56 | 160 | 56 | 0.35 | 1.0 |
| $Li_{9.2}H_{0.6}RHO(3.9)$ | ND | 1.2 | 1.77E-02 | 1.0 | 65 | 117 | 46 | 79 | 14 | 0.58 | 3.2 |
| $Li_{9.2}RHO(4.2)$ | ND | 1.2 | 2.40E-01 | 1.0 | 51 | 323 | 52 | 0.11 | 0.18 | 0.08 | 1.4 |
| $Li_{7.8}Ca_{1.0}RHO(3.9)$ | 14.211 | 0.8 | ND | 2.5 | ND | ND | ND | ND | ND | ND | ND |
| $Li_{7.4}Zn_{1.2}RHO(3.9)$ | 14.300 | 0.6 | 3.52E-02 | 1.0 | 40.3 | 207 | 48 | 80 | 21 | 0.6 | 2.3 |
| $Li_{6.0}H_{1.8}Zn_{1.0}Na_{0.6}RHO(3.6)$ | ND | 0.6 | 2.04E-01 | 1.0 | 58 | 485 | 51 | 0.11 | 0.21 | 0.10 | 1.1 |
| $Li_{5.2}Zn_{1.8}H_{0.5}Na_{0.5}RHO(3.9)$ | 14.330 | 0.5 | 3.70E-01 | 1.0 | 53 | 525 | 52 | 118 | 47 | 0.44 | 1.1 |
| $Zn_{4.1}Li_{1.1}Na_{0.5}RHO(3.9)$ | 14.489 | 0.5 | 9.73E-01 | 1.0 | 23 | 45 | 52 | 144 | 52 | 0.36 | 1.0 |
| $Cu_{3.4}Li_{2.8}Na_{0.2}RHO(3.9)$ | 14.867 | 0.2 | 7.60E-01 | 1.0 | 2.1 | 0.83 | 60 | 92 | 62 | 0.65 | 1.0 |
| $Li_{7.8}H_{2.0}RHO(3.9)$ | ND | 0 | 3.60E-02 | 1.0 | 51 | 171 | 53 | 85 | 29 | 0.62 | 1.8 |
| $Zn_{5.7}RHO(3.2)$ | 14.437 | 0 | 9.00E-02 | 2.5 | 43 | 282 | 39 | 91 | 30 | 0.43 | 1.3 |
| $Li_{6.8}H_{3.0}RHO(3.9)$ | ND | 0 | 1.10E-01 | 1.0 | 43 | 224 | 51 | 81 | 39 | 0.63 | 1.3 |
| $Zn_{4.9}RHO(3.9)$ | 14.541 | 0 | 3.70E-01 | 1.0 | 10 | 45 | 50 | 141 | 48 | 0.35 | 1.0 |
| $Li_{5.8}H_{4.0}RHO(3.9)$ | ND | 0 | 3.73E-01 | 1.0 | 31 | 120 | 52 | 80 | 47 | 0.65 | 1.1 |
| $H_{10.7}RHO(3.5)$ | ND | 0 | 5.80E-01 | 1.0 | 4.1 | 3.7 | 39 | 50 | 39 | 0.78 | 1.0 |
| $Cu_{5.7}RHO(3.2)$ | 14.915 | 0 | 6.10E-01 | 2.5 | 1.4 | 0.7 | 52 | 72 | 53 | 0.72 | 1.0 |
| $H_{9.2}RHO(4.2)$ | 15.035 | 0 | 7.10E-01 | 1.0 | 1.3 | 0.8 | 69 | 91 | 76 | 0.76 | 0.9 |
| $Cu_{4.9}RHO(3.9)$ | 14.938 | 0 | 7.20E-01 | 1.0 | 1.6 | 0.94 | 66 | 92 | 68 | 0.72 | 1.0 |
| 4A | NA | NA | 4.80E-01 | 5 | 25 | 16 | 41.8 | 113 | 39 | 0.37 | 1.1 |

TABLE 3-continued

Structural and Adsorption Data for Adsorbents of the Invention and Prior Art Materials.

| Adsorbent | RHO Unit Cell axis (Å) | Required minimum 8-ring occupancy of non-proton cations | $O_2$ D/r² | Particle size (μm) | Kinetic Selectivity $O_2/N_2$ | Kinetic Selectivity $O_2/Ar$ | $O_2$ Pmax (torr) | $N_2$ Pmax (torr) | Ar Pmax (torr) | $O_2$ Pmax*/ $N_2$ Pmax* | $O_2$ Pmax*/ Ar Pmax* |
|---|---|---|---|---|---|---|---|---|---|---|---|
| CMS | NA | NA | 8.83E−03 | 4.5 | 36.5 | 64.7 | 107.3 | 107 | 107 | 1.0 | 1.0 |
| RS10[a] | NA | NA | 9.94E−03 | ND | 35.0 | 35 | ND | ND | ND | ND | ND |
| Ba-RPZ-3[b] | NA | NA | 2.43E−03 | ND | 1.0 | 6 | ND | ND | ND | ND | ND |

[a]S. Farooq, *Gas Separations and Purification*, Vol. 9, No. 3, pp 205-212.
[b]S. Kuznicki, B. Dunn, E Eyring and D. Hunter, *Separation Science and Technology*, 2009, 44: 7, pp 1604-1620.
[c]$N_2$ and Ar not fully equilibrated and their rates are overestimated. The Pmax reported reflects pressure drop over 30 minutes of measurement.
[d]$O_2$ not fully equilibrated and its rate is overestimated. The Pmax reported reflects pressure drop over 30 minutes of measurement.
NA = Not applicable
ND = Not Determined The theory behind the derivation of the diffusion parameter is given by the Fickian Diffusion model in which a special case of a more rigorous chemical potential driving force model for adsorbate transport within the adsorbent particle is used. The effect of finite system volume on overall kinetics is also considered. The analytical form of the model is given by Equation 2:

$$f(t) = 1 - 6 \sum_{n=1}^{\infty} \frac{\exp\left(-\frac{D P_n^2 t}{r^2}\right)}{\frac{9\gamma}{1-\gamma} + (1-\gamma)P_n^2}$$

Where f(t) is the fractional uptake, D is the intra-crystalline diffusivity, r is crystal radius (diffusional length scale), t is the time, γ is the fraction of adsorbate ultimately adsorbed by the adsorbent and $P_n$ are the non-zero roots of Equation 3:

$$\tan P_n = \frac{3 P_n}{3 + \left(\frac{1}{\gamma} - 1\right)P_n^2}$$

as set forth in chapter 6 of Ruthven, D. M. *Principles of Adsorption and Adsorption Processes*, John Wiley and Sons, New York, 1984.

Kinetic selectivity parameters were measured for the RHO compositions of this invention and compared with other zeolite and carbon molecular sieve (CMS) materials tested internally and from the literature. All of the RHO samples described herein were activated under vacuum (<10 mPa) at 400° C. for at least 8 hours to remove water and $CO_2$ prior to adsorption measurements. The results are compiled in Table 3.

Figure 6:
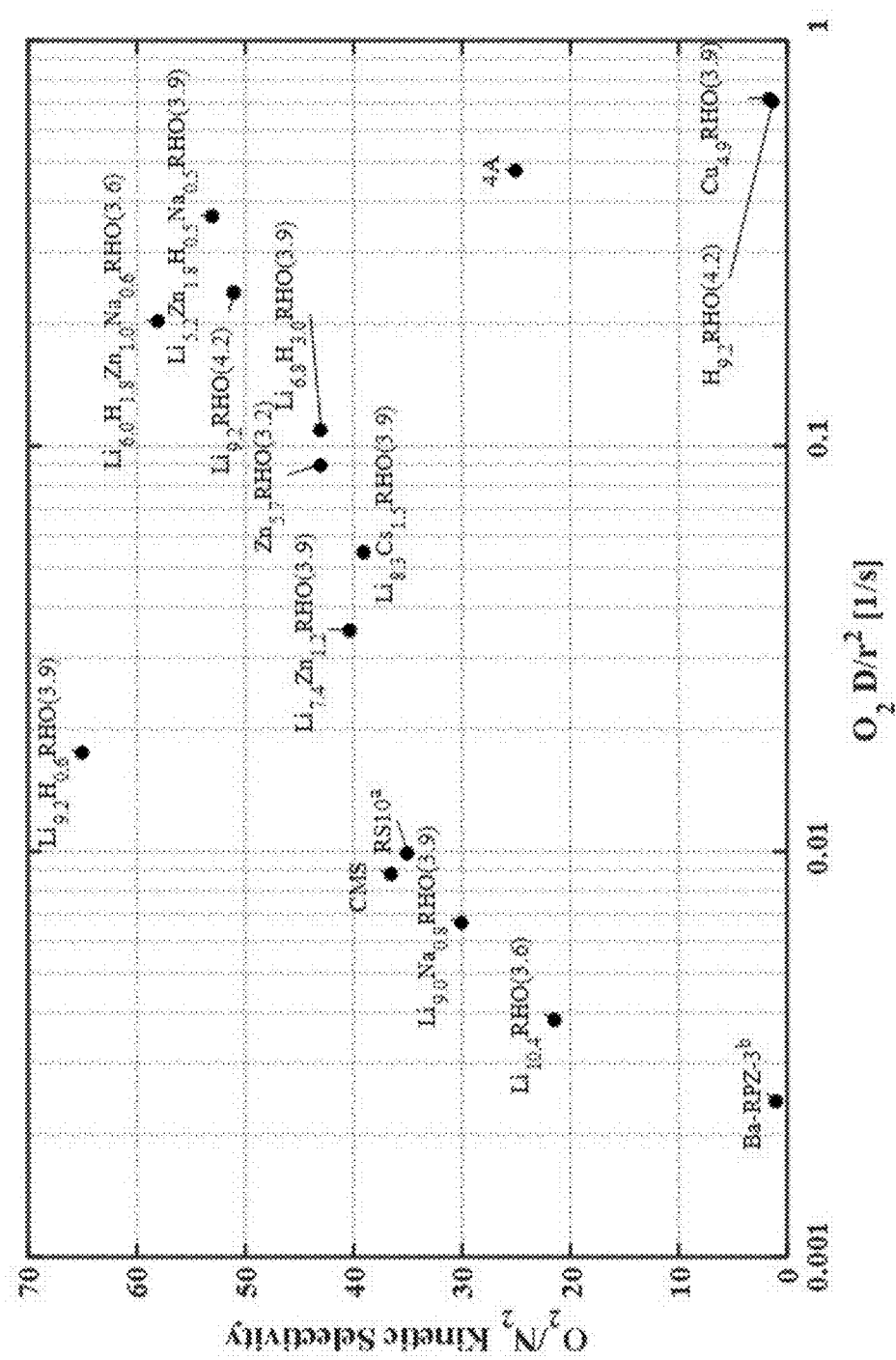
FIG. 6 is a graph of kinetic selectivity of O$_2$ vs. N$_2$ plotted against O$_2$ uptake rate for a range of RHO and literature zeolites. $^a$S. Farooq, Gas Separations and Purification, Vol. 9, No. 3, pp 205-212. $^b$S. Kuznicki, B. Dunn, E Eyring, and D. Hunter, Separation Science and Technology 2009, 44:7, pp 1604-1620.
Figure 7:
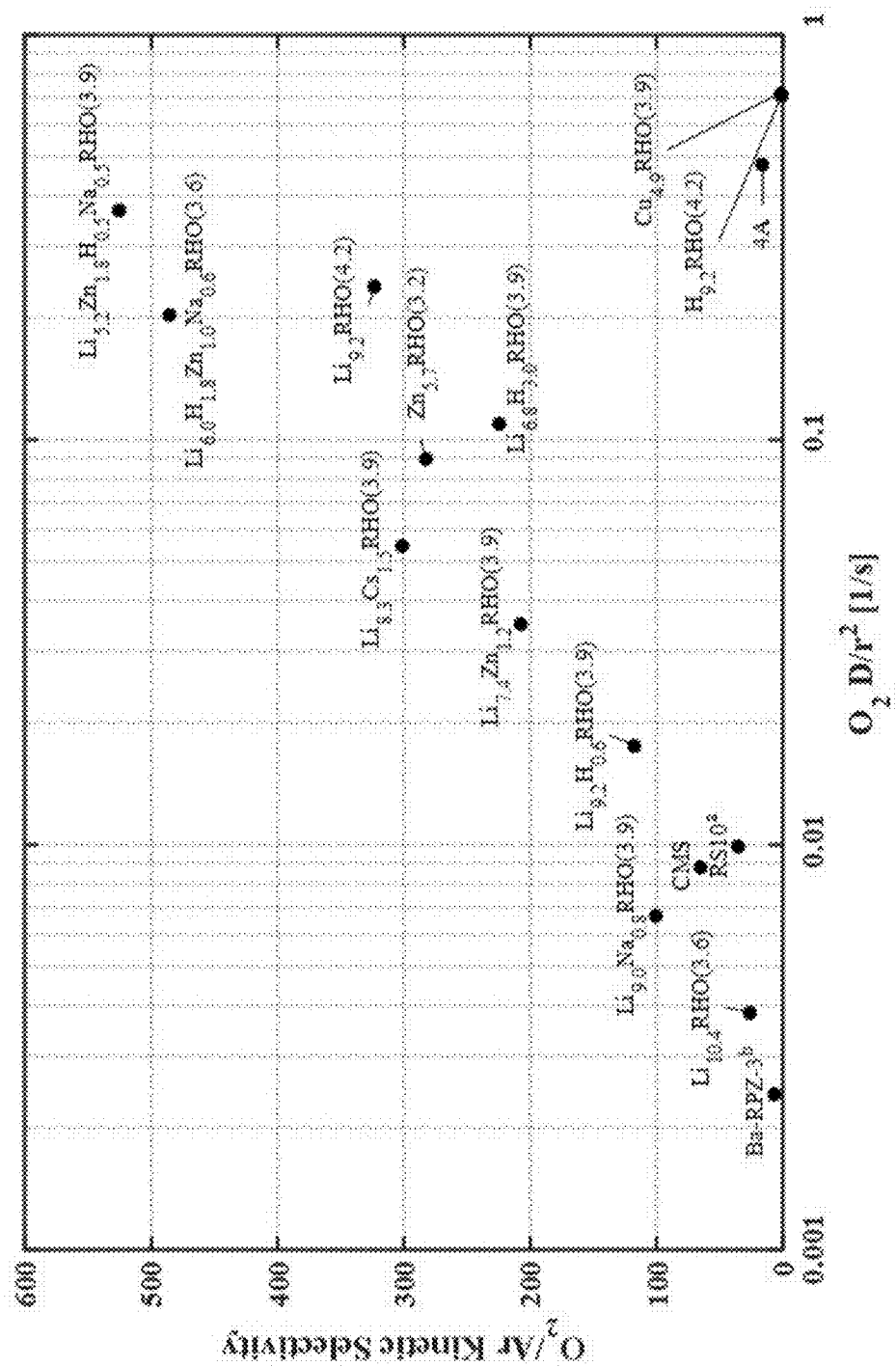
FIG. 7 is a graph of kinetic selectivity of O$_2$ vs. Ar plotted against O$_2$ uptake rate for a range of RHO and literature zeolites. $^a$S. Farooq, Gas Separations and Purification, Vol. 9, No. 3, pp 205-212. $^b$S. Kuznicki, B. Dunn, E Eyring, and D. Hunter, Separation Science and Technology 2009, 44:7, pp 1604-1620.

The ambient temperature data in Table 3 and FIGS. 6 and 7 represent a wide range of RHO phases with Si/Al between 3.2 and 4.2, which show significantly better kinetic selectivity for $O_2$ vs. both Ar and $N_2$ than CMS or known commercial zeolites, while maintaining $O_2$ uptake rates that are 10 to 50× faster than CMS. Surprisingly, the rates are some 1000 to 5000× faster than the Li-rich RHO materials reported by Corbin in U.S. Pat. No. 7,169,212.

CMS, RS10, 4 A, and the MOF Ba-RPZ-3 show poorer selectivities at slower rates, apart from 4 A zeolite. While 4 A zeolite shows very fast $O_2$ uptake, its selectivity for $O_2$ vs. Ar adsorption is much lower than most of the RHO materials.

The $O_2$ vs. $N_2$ equilibrium selectivity of low-silica zeolites is typically less than 0.5, owing to the stronger quadrupole interactions between $N_2$ and electropositive extra framework cations of the zeolite. The equilibrium data in Table 3 demonstrate that a number of the RHO zeolites also show this behavior, but as can be seen in FIG. 5, the $O_2$ vs. $N_2$ equilibrium selectivity can be significantly improved by increasing the number of protons exchanged for Li⁺ in a $Li_{9.0}Na_{0.8}RHO(3.9)$ zeolite starting zeolite. Complete exchange to the fully protonated RHO results in slight de-alumination, but also increases the $O_2/N_2$ equilibrium selectivity to 0.76. Unfortunately, the lack of 8-ring distortion by these cations leads to negligible kinetic selectivity between $O_2$ and $N_2$. By balancing improved $O_2$ vs. $N_2$ equilibrium selectivity with high kinetic selectivity and rate, it appears that an optimum is achieved on exchange of 3-4 protons (FIGS. 1 and 5).

Example 9: Isotherm Measurements

Isotherms at various temperatures were measured on $Li_{5.2}Zn_{1.8}H_{0.5}Na_{0.5}RHO$ (3.9), $Li_{6.8}H_{3.0}RHO(3.9)$, the $Li_{9.5}Na_{1.6}Cs_{0.3}RHO(3.2)$ analog to the material of Corbin, and $Zn_{4.1}Na_{1.6}RHO(3.9)$ using a 3FLEX Surface Characterization Unit from Micromeritics for pressures measured up to 1 atm absolute or on a VTI HPA 300 Adsorption Unit for pressures measured up to 10 atm absolute. Isotherms were collected for $O_2$, $N_2$ and Ar at 5, 23, and 45° C. for the first three samples and on $N_2$ and Ar at 23 and 45° C. for $Zn_{4.1}Na_{1.6}RHO(3.9)$. Isotherm plots comparing $O_2$ and Ar capacities measured up to 10 atm are shown in FIGS. 4a for $Li_{5.2}Zn_{1.8}H_{0.5}Na_{0.5}RHO$ (3.9).

Figure 8:
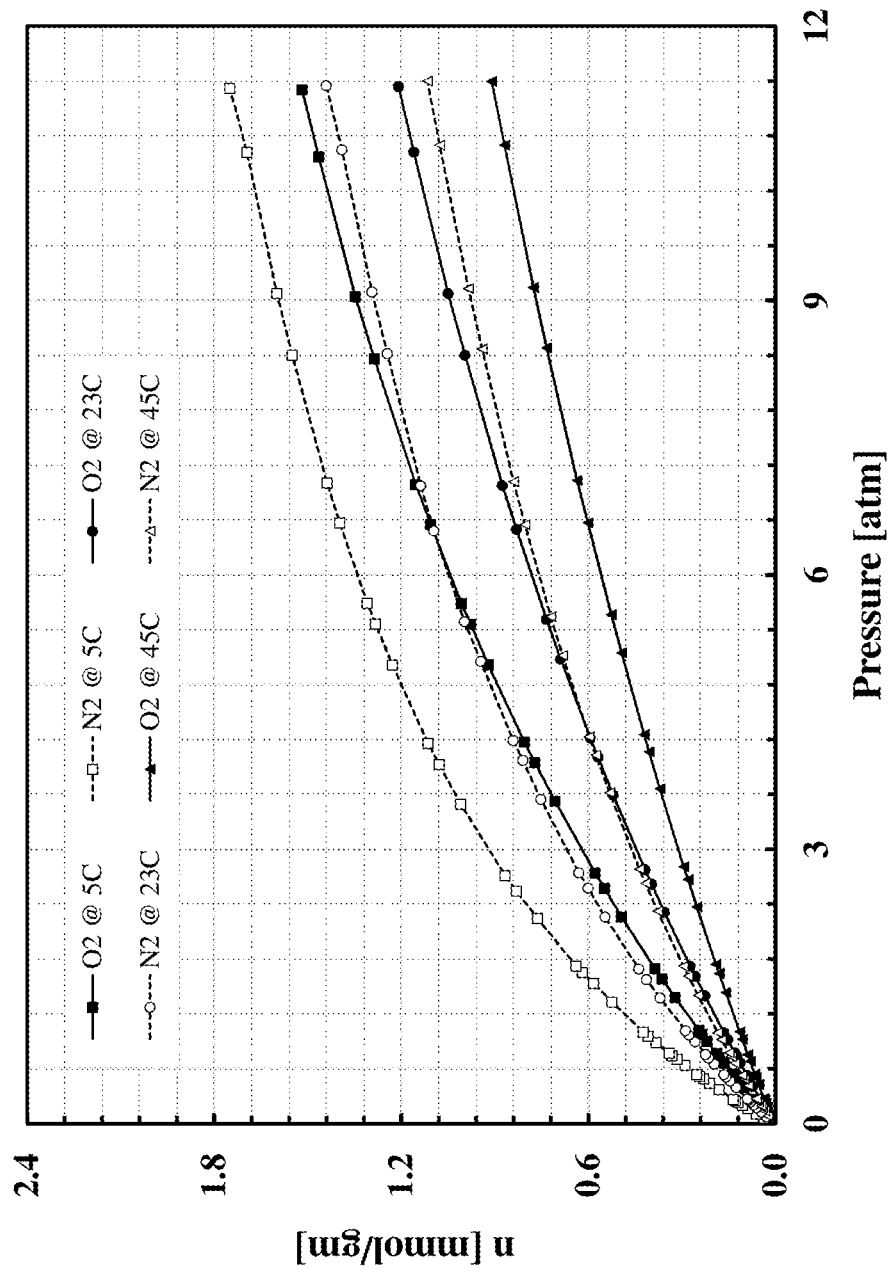
FIG. 8 is a graph showing the isotherms of O$_2$ and N$_2$ at 5, 23 and 45° C. on Li$_{6.8}$H$_{3.0}$RHO(3.9).
Figure 9:
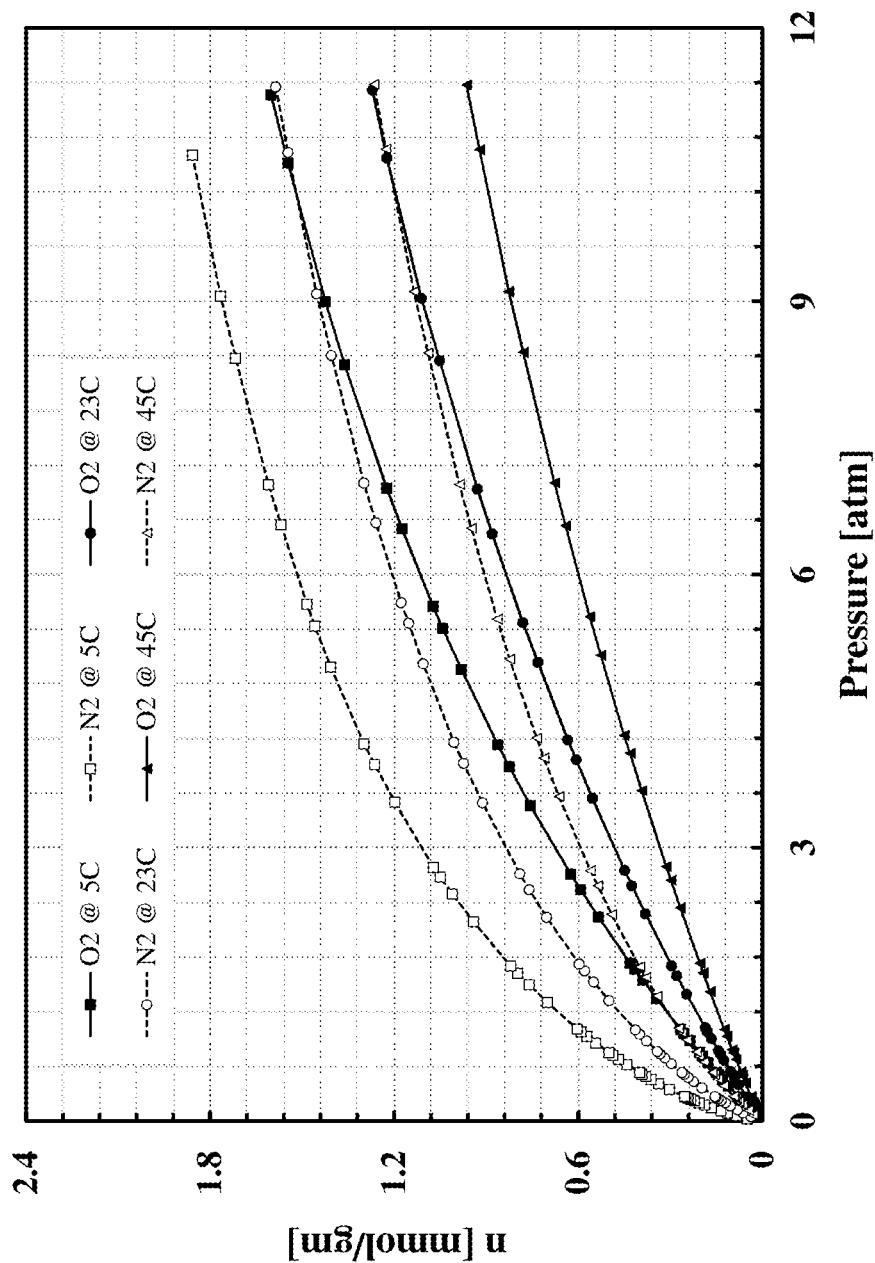
FIG. 9 is a graph showing the isotherms of O$_2$ and N$_2$ at 5, 23 and 45° C. on Li$_{5.2}$Zn$_{1.8}$H$_{0.5}$Na$_{0.5}$RHO(3.9).
Figure 10:
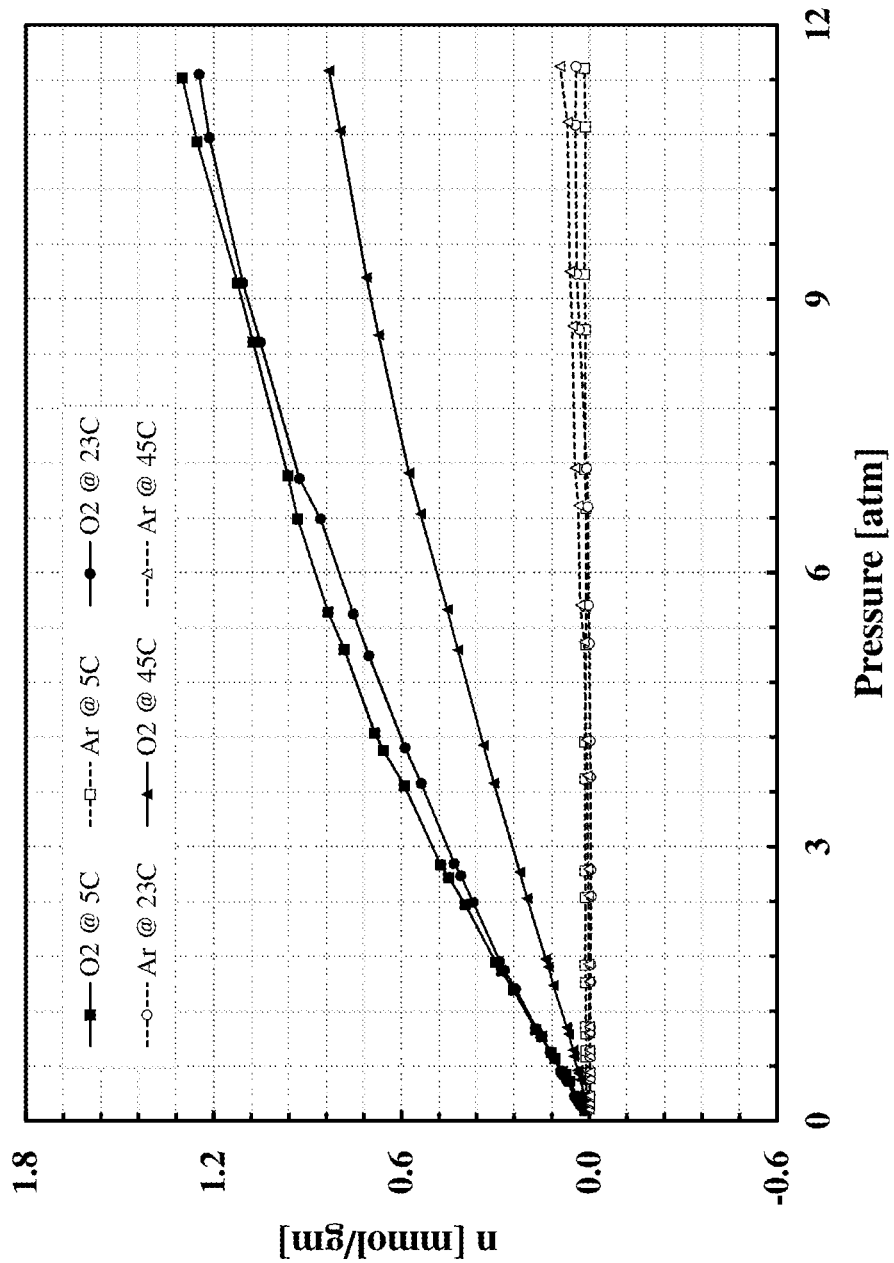
FIG. 10 is a graph showing the isotherms of O$_2$ and Ar at 5, 23 and 45° C. on Li$_{9.5}$Na$_{1.6}$Cs$_{0.3}$RHO(3.2).

The isotherms measured up to 1 atm for $Li_{5.2}Zn_{1.8}H_{0.5}Na_{0.5}RHO(3.9)$ are shown in FIG. 4b, and an $O_2$ vs. Ar equilibrium selectivity of close to 1 is observed at 23° C. Effective equilibrium selectivity for $O_2$ vs. Ar is observed as the adsorption temperature is dropped below 23° C., which is likely associated with temperature dependent contraction and reduced vibration of the RHO 8 rings. The $O_2$ and $N_2$ isotherms for $Li_{6.8}H_{3.0}RHO(3.9)$ in FIG. 8 and $Li_{5.2}Zn_{1.8}H_{0.5}Na_{0.5}RHO(3.9)$ in FIG. 9 show improved $O_2/N_2$ equilibrium selectivity for $Li_{6.8}H_{3.0}RHO(3.9)$ vs $Li_{5.2}Zn_{1.8}H_{0.5}Na_{0.5}RHO(3.9)$. The isotherms for the $Li_{9.5}Na_{1.6}Cs_{0.3}RHO(3.2)$ are shown in FIG. 10. A curious feature of the isotherm data for this composition is that the $O_2$ capacities at 5 and 23° C. are nearly identical. It is unclear if this is a consequence of the extreme slowness of the $O_2$ uptake at 5° C., or if the slight contraction of the 8 ring windows going from 23 to 5° C. leads to fewer accessible sites for the oxygen. The $N_2$ and Ar isotherms for $Zn_{4.1}Na_{1.6}RHO(3.9)$ are shown in FIG. 11.

Example 10: Argon Production Via Ambient Temperature PSA with $Li_{5.2}Zn_{1.8}H_{0.5}Na_{0.5}RHO(3.9)$ A 2-bed multi-step pressure swing adsorption (PSA) process cycle is used to evaluate process performance indicators in the form of primary product (Ar) recovery and productivity using $Li_{5.2}Zn_{1.8}H_{0.5}Na_{0.5}RHO(3.9)$ adsorbent. The adsorbent characteristics and adsorbent bed characteristics used in the simulation are shown in Table 4.

top and bottom end of the bed, respectively. No product is withdrawn during this phase of process cycle. The feed step (F2 and F3) is continued until the mass transfer zone of preferentially adsorbed component ($O_2$) reaches the exit end of the bed without substantially breaking through it, and the un-adsorbed gas (first purified Ar) is discharged from the outlet end of bed. The feed gas consists of 79.95 mole % Ar, 20.00 mole % $O_2$ and balance $N_2$. After the feed step, the bed pressure is reduced to 7.79 bara through stopping feed flow and extracting product from top end of the bed (CoD). At the termination of CoD step, there is an idle step (I1). Then, the bed (EQD1) is connected with the second bed undergoing equalization re-pressurization step (EQR1) and a portion of the void as well as desorbed gas is transferred from the product end of first bed to the product end of second bed, thus lowering the first bed pressure to approximately 6.67 bara at the end of this step (EQD1). Following this step, a

TABLE 4

Characteristics of the bed and adsorbent as well as the operating conditions used to evaluate process performance indicators.

| Adsorbent Characteristics | | | |
|---|---|---|---|
| Adsorbent type | $Li_{5.2}Zn_{1.8}H_{0.5}Na_{0.5}RHO$ (3.9) | $Li_{6.8}H_{3.0}RHO$ (3.9) | $Zn_{4.1}Li_{1.1}Na_{0.5}RHO$ (3.9) |
| Adsorbent diameter (m) | 0.002 | 0.002 | 0.002 |
| Total void fraction | 0.65 | 0.65 | 0.65 |
| Interstitial void fraction | 0.40 | 0.40 | 0.40 |
| Bulk density (kg/m$^3$) | 800.92 | 800.92 | 800.92 |
| Rate constant (D/r$^2$) for | | | |
| Oxygen (1/s) | 0.3700 | 0.1100 | 0.9730 |
| Nitrogen (1/s) | 0.00698 | 0.00256 | 0.0423 |
| Argon (1/s) | 0.00070 | 0.00049 | 0.0216 |
| Bed Characteristics | | | |
| Number of beds | 2 | 2 | 2 |
| Bed length (m) | 2.40 | 2.40 | 2.40 |
| Bed inside diameter (m) | 2.0 | 2.0 | 2.0 |
| Middle port from bottom (m) | 1.35 | 1.35 | 1.35 |
| Bed wall thickness (m) | 0.016 | 0.016 | 0.016 |
| Feed end head space (m$^3$) | 0.096 | 0.096 | 0.096 |
| Exit end head space (m$^3$) | 0.113 | 0.113 | 0.113 |
| Operating Conditions | | | |
| Temperature (° C.) | 37.78 | 37.78 | 37.78 |
| [1]Feed pressure (bara) | 7.90 | 7.90 | 7.90 |
| [2]Purge pressure (bara) | 1.09 | 1.09 | 1.08 |
| [3]Purge to feed ratio | 0.14 | 0.14 | 0.36 |
| Feed mole fraction for | | | |
| Oxygen | 0.20 | 0.20 | 0.20 |
| Nitrogen | 0.0005 | 0.0005 | 0.001 |
| Argon | 0.7995 | 0.7995 | 0.799 |
| Cycle time (s) | 60 | 64 | 300 |
| Process Performance | | | |
| Primary impurity removed | $O_2$ | $O_2$ | $N_2$ |
| Primary product impurity (ppm) | 2.0 | 2.0 | 1.0 |
| Argon recovery (%) | 61.44 | 56.01 | 38.67 |
| Productivity (nm$^3$/h/m$^3$) | 283.12 | 215.51 | 87.35 |

[1]Pressure is at the middle of the bed and at the end of feed step,
[2]Pressure is at the middle of the bed and at the end of purge step,
[3]Ratio is based on average purge and average feed flows in lb-moles/h.

Figure 12:
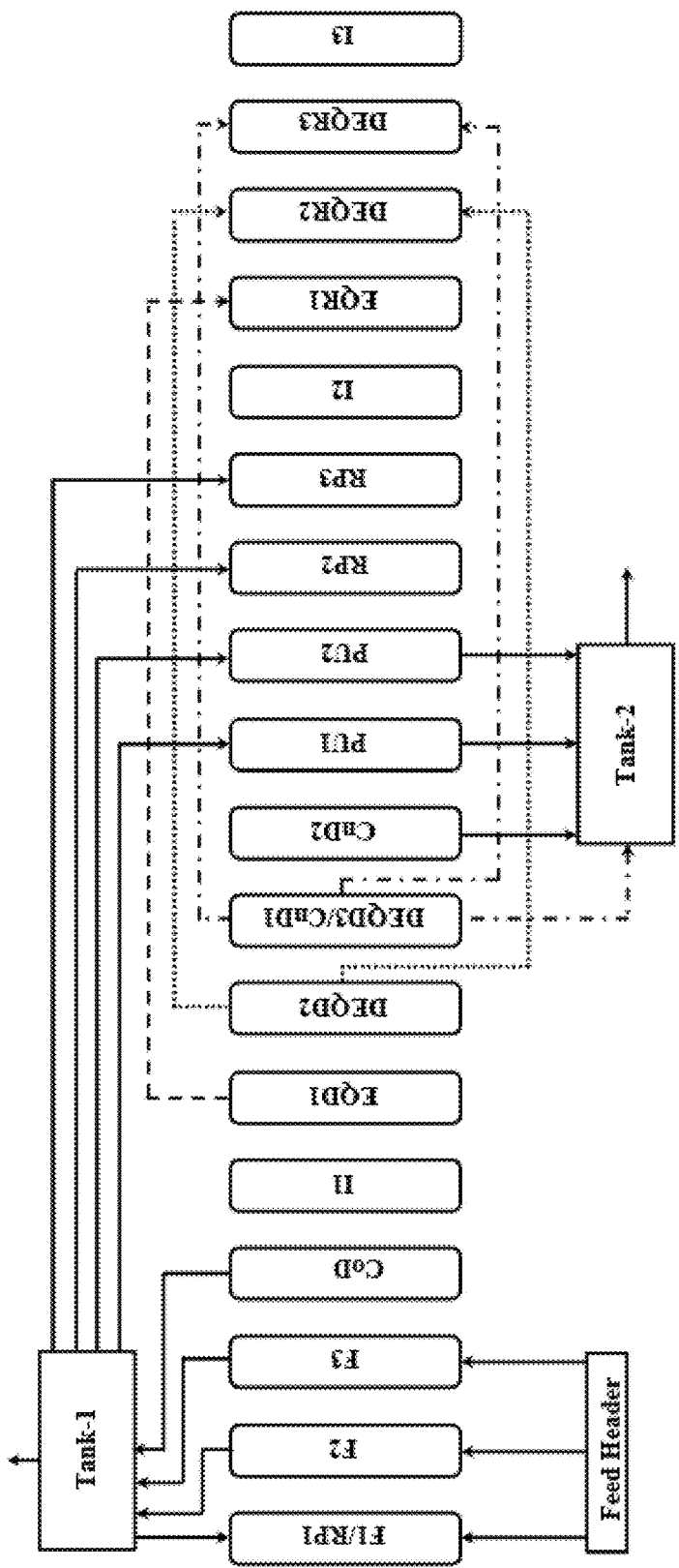
FIG. 12 is a schematic showing the operation of a 2-bed multi-step Ar PSA cycle. Here F (F1, F2, and F3): feed, CoD: co-current depressurization, I (I1, I2, and I3): idle, EQD1: equalization depressurization 1, DEQD2: dual equalization depressurization 2, DEQD3: dual equalization depressurization 3, CnD (CnD1 and CnD2): counter-current depressurization, PU (PU1 and PU2): product purge, RP (RP1, RP2, and RP3): product re-pressurization, EQR1: top equalization re-pressurization 1, DEQR2: dual equalization re-pressurization 2, DEQR3: dual equalization re-pressurization 3.

The PSA cycle is operated by following the sequence shown in FIG. 12 at a feed pressure of 7.90 bara and a temperature of 37.78° C. At the start of the cycle (F1/RP1), the bed is pressurized to the highest-pressure level of the cycle with the addition of primary product and feed gas from dual end equalization de-pressurization step (DEQD2) is introduced to transfer more co-adsorbed as well as void gases from the first bed to the second bed from top as well as middle of the first bed to the bottom of the second bed until the pressure of the first bed goes down to approximately 4.54 bara. The dual end depressurization step is then coupled with counter-current depressurization step (DEQD3/CnD1) which further reduces the pressure of the bed to approximately 3.03 bara. The column is then counter-currently de-pressurized (CnD2) and purged (PU1 and PU2) at 1.09 bara, and thereafter, re-pressurized (RP2 and RP3) counter-currently with primary product gas at 1.51 bara. Following the re-pressurization step, the column is subsequently pressurized through pressure equalization re-pressurization steps (EQR1, DEQR2, and DEQR3) to bring back the pressure level for initiation and repetition of the cycle. Note that three idle steps (I1, I2, and I3) are incorporated into the cycle schedule and during this step the bed is isolated and all valves leading to it are closed.

Figure 13:
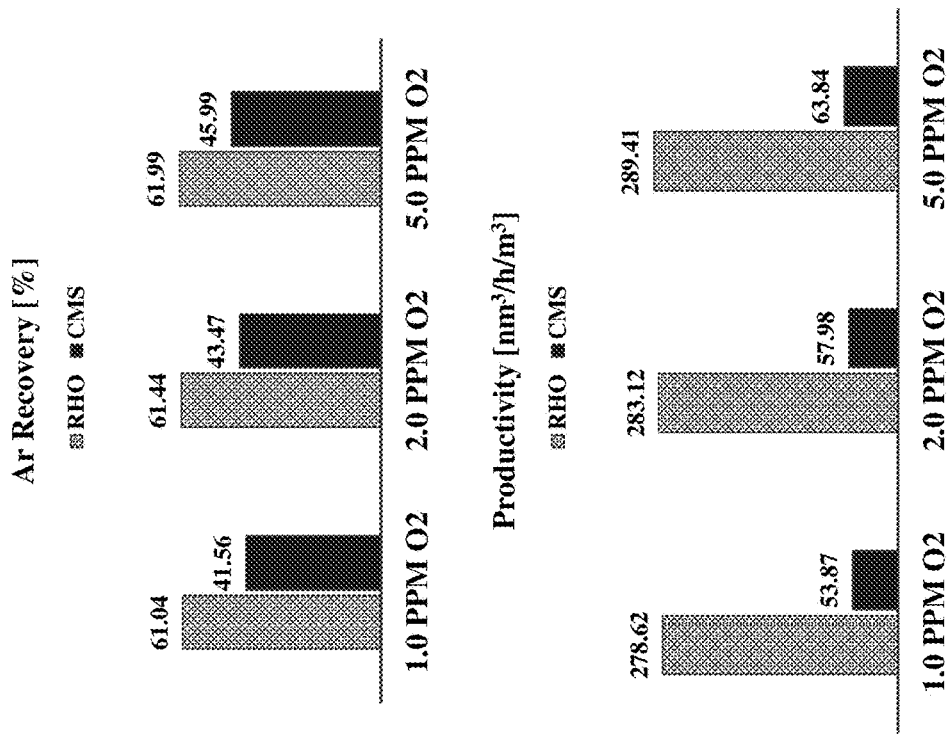
FIG. 13 depicts the results of a comparison of Ar recovery and productivity on RHO and CMS type of adsorbent. The x-axis represents the concentration of O$_2$ impurity in the product.

With all the steps, the full cycle completes in 60 seconds. The net $O_2$-free (2 ppm $O_2$ in primary product) Ar recovery from the feed gas is 61.44% and the productivity is 283.12 $Nm^3/h/m^3$ bed. The Ar recovery and productivity benefits of RHO type adsorbent are compared with carbon molecular sieve (CMS) based PSA process in FIG. 13 for 1, 2, and 5 ppm $O_2$ in primary product. Note that the process conditions and the cycle sequence are kept same as mentioned above for the comparison. These performance benefits result in the following commercial advantages:

Argon recovery is improved from about 40 to 45% in CMS to 61% in RHO adsorbents for product $O_2$ purity range from 1 to 5 ppm. In the case of process integration, this higher recovery reduces recycle back to the distillation column.

Argon productivity is improved about 5 times versus a CMS based PSA process, reducing bed size and cost and enabling crude argon purification of larger feed flows.

Use of RHO zeolites in place of CMS eliminates the safety concern of combustible carbon particles in an $O_2$-rich environment if the PSA waste stream is recycled back to the distillation column is used. Thus, filters present in CMS Argon PSA are eliminated, resulting in reduced equipment and capital expenditure.

Example 11: Argon Production Via Ambient Temperature PSA with $Li_{6.8}H_{3.0}RHO(3.9)$ This example compares the process performances in terms of argon recovery and productivity of the RHO composition $Li_{6.8}H_{3.0}RHO(3.9)$ with the RHO composition $Li_{5.2}Zn_{1.8}H_{0.5}Na_{0.5}RHO(3.9)$. The 2-bed PSA process cycle described above is used to evaluate the process performances. The adsorbent and bed characteristics as well as operating conditions are summarized in Table 4. For both cases, the PSA process is independently optimized for final evaluation. It is worth noting that like Example 10, this example deals with primarily oxygen removal by the PSA process. The process performances are summarized in Table 4. $Li_{5.2}Zn_{1.8}H_{0.5}Na_{0.5}RHO(3.9)$ is capable of enhancing recovery and productivity by about 10% and about 31% respectively due to its higher oxygen rate and higher oxygen over argon selectivity. It is worth noting that the simulation results are obtained for the purpose of demonstration. A different combination of argon recovery and productivity can be obtained by changing different parameters. For example, a productivity gain can be achieved by reducing cycle time which would affect the argon recovery to some extent.

Example 12: Simulation of Removal of Trace $N_2$ from Ar with $Zn_{4.1}Li_{1.1}Na_{0.5}RHO(3.9)$ This example deals with the removal of predominantly trace nitrogen from crude argon stream using a nitrogen selective RHO adsorbent, $Zn_{4.1}Li_{1.1}Na_{0.5}RHO(3.9)$. The 2-bed PSA cycle mentioned with Example 10 is used to evaluate the efficiency of this adsorbent for removing trance nitrogen from argon stream. The adsorbent and bed characteristics as well as the operating conditions are summarized in Table 4. It is worth mentioning that the adsorbent is also kinetically selective towards nitrogen, therefore, effective selectivity (which is a function of equilibrium and kinetic selectivity) is essentially higher. Another important characteristic of the adsorbent is that the isotherms of nitrogen, oxygen, and argon are less steep than commonly known thermodynamically selective zeolites. This means that a smaller purge to feed ratio is sufficient to maintain a reasonable performance.

The results from the simulation is summarized in Table 4. With 1000 ppm nitrogen in the feed and 1.0 ppm nitrogen in the product stream, an argon recovery and productivity of 38.67% and 87.35 $nm^3/h/m^3$ can be achieved at 37.78° C. and 7.90 bara.

Example 13: Simulation of Layered Bed for Ar PSA with Trace $N_2$ and $O_2$ Removal from Ar Stream Using Adsorbents from Present Invention in Both Layers This example is presented to illustrate the performance of a layered bed comprising of an equilibrium selective layer and a kinetically selective layer to simultaneously remove oxygen and nitrogen to produce very high purity argon stream using a pressure swing adsorption process at ambient temperature. The novelty can be understood through arrangement of the two layers in the same column in a pressure swing adsorption process at ambient temperature.

Two cases (Case 1 and Case 2) are created to better understand the invention. In Case 1, the adsorbent materials inside the columns are arranged in two separate layers: first layer of adsorbent with kinetic selectivity to one of the contaminant gases (in this case, oxygen), preferentially where the product gas (in this case argon) has very slow diffusion kinetics. The second layer is comprised of an adsorbent material where the separation is enabled by differences in equilibrium capacities, where the contaminant gas (mainly nitrogen) is more adsorbed than the product gas. The $Li_{5.2}Zn_{1.8}H_{0.5}Na_{0.5}RHO(3.9)$ is used in the first layer and the $Zn_{4.1}Li_{1.1}Na_{0.5}RHO(3.9)$ is used in the second layer. In Case 2, a reverse scenario is created, i.e., equilibrium adsorbent as the first layer and kinetic adsorbent in the second layer. The adsorbent and bed characteristics, layering information, and operating conditions can be found in Tables 4 and 5. Note that, the total bed length is maintained constant for both cases.

TABLE 5

Process summary for simultaneous oxygen and nitrogen removal using a layered bed conventional 2-bed PSA process.

|  | Case 1 | Case 2 |
|---|---|---|
| *Bed Characteristics* | | |
| Layering configuration | | |
| Feed end | $O_2$ removal (kinetic) layer | $N_2$ removal (equilibrium) |
| Product end | $N_2$ removal (equilibrium) layer | $O_2$ removal (kinetic) layer |
| Adsorbent for $O_2$ removal | $Li_{5.2}Zn_{1.8}H_{0.5}Na_{0.5}RHO$ (3.9) | $Li_{5.2}Zn_{1.8}H_{0.5}Na_{0.5}$ RHO (3.9) |
| Adsorbent for $N_2$ removal | $Zn_{4.1}Li_{1.1}Na_{0.5}RHO$ (3.9) | $Zn_{4.1}Li_{1.1}Na_{0.5}RHO$ (3.9) |
| Number of beds | 2 | 2 |
| Total bed length (m) | 3.9 | 3.9 |
| $O_2$ removal layer length (m) | 1.5 | 2.4 |
| Bed inside diameter (m) | 2.0 | 2.0 |
| Middle port from bottom (m) | 0.90 | 1.5 |
| *Operating Conditions* | | |
| Temperature (° C.) | 37.78 | 37.78 |
| [1]Feed pressure (bara) | 7.90 | 7.90 |
| [2]Purge pressure (bara) | 1.07 | 1.09 |
| [3]Purge to feed ratio | 0.12 | 0.15 |
| Feed mole fraction for | | |
| Oxygen | 0.20 | 0.20 |
| Nitrogen | 0.001 | 0.001 |
| Argon | 0.799 | 0.799 |
| Cycle time (s) | 170 | 120 |
| *Process Performance* | | |
| $O_2$ in primary product (ppm) | 2.0 | 2.0 |
| $N_2$ in primary product (ppm) | 1.0 | 1.0 |
| Argon recovery (%) | 28.63 | 33.32 |
| Productivity ($nm^3/h/m^3$) | 42.88 | 61.42 |

[1]Pressure is at the middle of the bed and at the end of feed step,
[2]Pressure is at the middle of the bed and at the end of purge step,
[3]Ratio is based on average purge and average feed flows in lb-moles/h.

The aforementioned processes (Cases 1 and 2) are applied to produce a product argon stream containing nitrogen and oxygen of 1.0 ppm and 2.0 ppm, respectively at 37.78° C. and 7.90 bara. As can be seen from Table 5, the feed gas consists of 0.1 mole % nitrogen, 20 mole % oxygen and balance argon. The 2-bed PSA cycle mentioned with previous examples is used for performance evaluation. From Table 5, it is clear that the second case performs better than Case 1 (about 16% better argon recovery and about 43% better productivity).

The purge is more efficient when an equilibrium layer is added in the feed end followed by a kinetic layer in the product end. The RHO adsorbents mentioned here are both capable of removing both oxygen and nitrogen to some extent from the argon stream. Thus, the nitrogen mass transfer zone from equilibrium layer can be pushed further towards the kinetic layer. This implies that the bed utilization is higher in conjunction with effective purge.

An interesting feature with the layering configuration is that the middle bed pressure transfer used in the PSA cycle plays an important role in providing an incremental benefit when equilibrium layer is placed in the feed end. The optimum location for the middle bed port is at the interface between equilibrium layer and kinetic layer as can be seen from Table 5. No significant benefit is observed with middle bed port location when kinetic layer ($O_2$ removal layer) is placed in the feed end.

Figure 14:
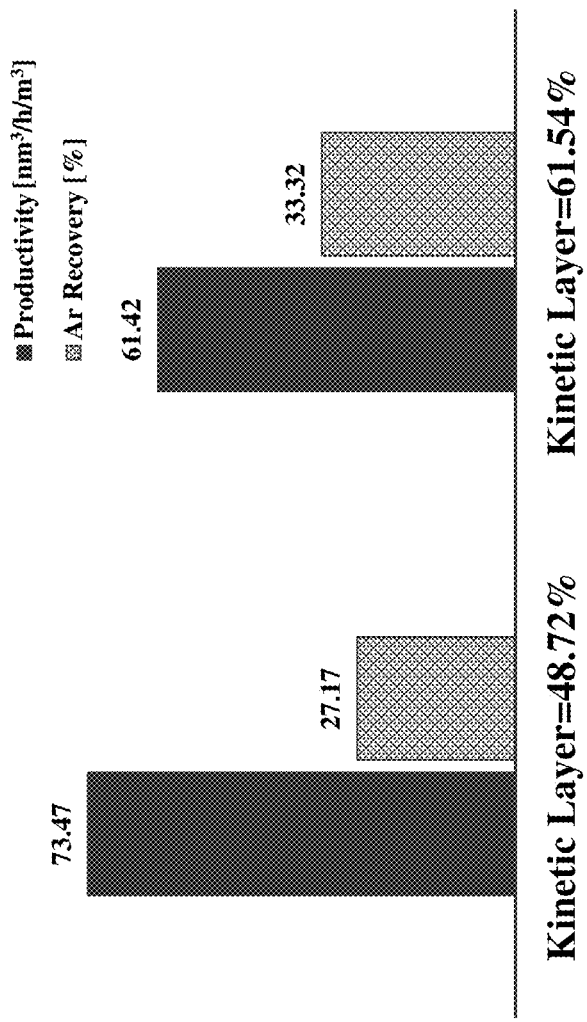
FIG. 14 depicts the results of a sensitivity study using a layering configuration where N$_2$ selective equilibrium layer is placed at feed end followed by an O$_2$ selective kinetic layer at product end.

With the preferred layering sequence discussed in Table 5, Case 2, it is observed from examples in FIG. 14 that increasing the proportion of $O_2$ selective kinetic layer can enhance argon recovery at the expense of reduced productivity. The PSA cycle configuration, adsorbent and bed characteristics, operating conditions, and product $O_2$ and $N_2$ levels are kept same as Case 2 mentioned above. The total bed length is also kept constant at 3.9 m.

TABLE 6

Process summary for simultaneous oxygen and nitrogen removal using a preferred layering configuration as defined in Table 5, Case 2 utilizing known adsorbents.

| Layering configuration | | | | |
|---|---|---|---|---|
| Feed end layer (equilibrium) | $N_2$ removal | $N_2$ removal | $N_2$ removal | $N_2$ removal |
| Product end layer (kinetic) | $O_2$ removal | $O_2$ removal | $O_2$ removal | $O_2$ removal |
| Adsorbent for $O_2$ removal layer | $Li_{6.8}H_{3.0}$ RHO(3.9) | $Li_{5.2}Zn_{1.8}H_{0.5}Na_{0.5}$RHO(3.9) | $Li_{5.2}Zn_{1.8}H_{0.5}Na_{0.5}$RHO(3.9) | $Li_{5.2}Zn_{1.8}H_{0.5}Na_{0.5}$RHO(3.9) |
| Adsorbent for $N_2$ | $Zn_{4.1}Li_{1.1}Na_{0.5}$RHO(3.9) | AgLiLSX | CaX | NaX |
| Number of beds | 2 | 2 | 2 | 2 |
| Total bed length (m) | 3.9 | 3.9 | 3.9 | 3.9 |
| $O_2$ removal layer length | 2.4 | 2.4 | 2.4 | 2.4 |
| Bed inside diameter | 2.0 | 2.0 | 2.0 | 2.0 |
| Middle port from For $N_2$ layer | 1.5 | 1.5 | 1.5 | 1.5 |
| [1]$K_{H, N2}$ (mmole/gm/bara) | 0.71 | 2.38 | 3.69 | 0.37 |
| Effective $N_2$/Ar | 6.55 | 18.77 | 17.33 | 3.32 |
| Temperature (° C.) | 37.78 | 37.78 | 37.78 | 37.78 |
| [2]Feed pressure (bara) | 7.90 | 7.90 | 7.90 | 7.90 |
| [3]Purge pressure (bara) | 1.07 | 1.10 | 1.12 | 1.08 |
| [4]Purge to feed ratio | 0.11 | 0.21 | 0.21 | 0.12 |
| Feed mole fraction for | | | | |
| Oxygen | 0.20 | 0.20 | 0.20 | 0.20 |
| Nitrogen | 0.001 | 0.001 | 0.001 | 0.001 |
| Argon | 0.799 | 0.799 | 0.799 | 0.799 |
| Cycle time (s) | 120 | 100 | 120 | 260 |
| $O_2$ in primary product | 2.0 | 2.0 | 2.0 | 2.0 |
| $N_2$ in primary product | 1.0 | 1.0 | 1.0 | 1.23 |
| Argon recovery (%) | 32.18 | 33.46 | 9.90 | 6.72 |
| Productivity (nm³/h/m³) | 58.03 | 78.05 | 15.89 | 4.79 |

[1]$K_{H, N2}$ is the Henry's law constant for $N_2$ at 37.78° C..
[2]Pressure is at the middle of the bed and at the end of feed step,
[3]Pressure is at the middle of the bed and at the end of purge step,
[4]Ratio is based on average purge and average feed flows in lb-moles/h.

Example 14: Simulation of a Layered Bed for Ar PSA with Trace $N_2$ and $O_2$ Removal from Ar Stream Using $Li_{6.8}H_{3.0}$ RHO(3.9) as $O_2$ Removal Layer and $Zn_{4.1}Li_{1.1}$ $Na_{0.5}$RHO (3.9) as $N_2$ Removal Layer This example illustrates the performance of a layered bed pressure swing adsorption (PSA) process for trace $N_2$ removal and for $O_2$ removal in which the $Zn_{4.1}Li_{1.1}Na_{0.5}$RHO (3.9) adsorbent is used as $N_2$ removal layer and the $Li_{6.8}H_{3.0}$RHO(3.9) adsorbent is used as $O_2$ removal layer. The adsorbents inside the PSA bed are arranged in the same manner as explained with Case 2 in Example 13: $N_2$ removal layer is used in the feed end (as first layer) and $O_2$ removal layer is in the product end (as second layer).

An adsorption process simulator is used to evaluate the layered bed PSA performance using the above layering configuration for a feed gas composition of 0.1 mole % nitrogen, 20.0 mole % oxygen and balance argon. The feed pressure is 7.90 bara, purge pressure is 1.07 bara and temperature is 37.78° C. Note that the 38.46% of the total bed length is filled with adsorbent for $N_2$ removal layer and 61.54% of the length is filled with $O_2$ removal layer. The adsorbent and bed characteristics, layering information, and operating conditions can be found in Table 6. The 2-bed PSA cycle mentioned with previous examples is used for performance evaluation.

The process is simulated to produce a product argon stream containing nitrogen and oxygen of 1.0 ppm and 2.0 ppm, respectively. The process performance is summarized in Table 6. It is clear from the table that the adsorbent $Li_{6.8}H_{3.0}$RHO(3.9) is not as efficient as the adsorbent $Li_{5.2}Zn_{1.8}H_{0.5}Na_{0.5}$RHO(3.9). With $Li_{6.8}H_{3.0}$RHO(3.9) the argon recovery is 3.4% worse and the productivity is 5.5% worse than with $Li_{5.2}Zn_{1.8}H_{0.5}Na_{0.5}$RHO(3.9).

Example 15: Simulation of a Layered Bed for Ar PSA with Trace $N_2$ and $O_2$ Removal from Ar Stream Using the Inventive RHO, $Li_{5.2}Zn_{1.8}H_{0.5}Na_{0.5}$RHO (3.9) as $O_2$ Removal Layer and Known Adsorbents for $N_2$ Removal Layer This example is presented to illustrate the performances of layered bed comprising of known adsorbents for trace nitrogen removal (selected from the group formed by mordenite, ferrierite, clinoptilolite and the type A, X, Y, or mixture therefrom) and the inventive RHO, $Li_{5.2}Zn_{1.8}H_{0.5}Na_{0.5}$RHO(3.9) for oxygen removal layer to simultaneously remove oxygen and nitrogen to produce very high purity argon stream using a pressure swing adsorption (PSA) process at ambient temperature. The adsorbents inside the PSA bed are arranged in the same manner as explained with Case 2 in Example 13: nitrogen removal layer is in the feed end (as first layer) and oxygen removal layer is in the product end (as second layer).

The inventors have identified that employing a suitable conventional adsorbent for nitrogen removal layer (selected from the group formed by mordenite, ferrierite, clinoptilolite, chabazite and the type A, X, Y, or mixture therefrom) can enhance the overall performance of the layered bed process. The criterion used for selecting a suitable adsorbent for nitrogen removal is based on the Henry's Law constant for nitrogen ($K_{H,N2}$). The Henry's Law constant for an adsorption isotherm is defined as the initial isotherm slope. See, for example, "*Physical Adsorption of Gases*", Young, D. M. and Crowell, A. D., p. 104 (Butterworths, London 1962). The unit of the constant is in amount of gas adsorbed per unit weight of adsorbent per unit of pressure (e.g., mmole of gas adsorbed/gm of adsorbent/bar absolute pressure).

An adsorption process simulator is used to evaluate the layer bed PSA performance using the above layering configuration with different adsorbents for nitrogen removal for a feed gas composition of 0.1 mole % nitrogen, 20.0 mole % oxygen and balance argon. The feed pressure is 7.90 bara and temperature is 37.78° C. Note that the 38.46% of the total bed length is filled with adsorbent for nitrogen removal layer and 61.54% of the length is filled with oxygen removal layer. The adsorbent and bed characteristics, layering information, operating conditions and process performances are summarized in Table 6. The 2-bed PSA cycle mentioned with previous examples is used for performance evaluation.

It is clear from Table 5, Case 2 and Table 6 that there is a preferred range of 0.5 to 3.0 mmole/gm/bara at 37.78° C. for Henry's law constant for nitrogen which significantly improves argon recovery and productivity under layering configuration. For example, when the product end of the bed (second layer) consists essentially of the RHO adsorbent from the invention (predominantly for oxygen removal) and the feed end (first layer) consists of AgLiLSX (predominantly for nitrogen removal), the performances are significantly better than other adsorbents considered in Table 6. Note that the $K_{H,N2}$ for AgLiLSX is 2.38 mmole/gm/bara and the effective selectivity for nitrogen over argon (function of Henry's law constant and kinetics as set forth in "*Pressure Swing Adsorption*" Ruthven, D. M.; Farooq, S. and Knaebel, K. S., p. 52 (VCH, New York, 1994) is 17.33 at 37.78° C. Above the suitable range of the Henry's constant for nitrogen, the adsorbate (nitrogen) is more strongly adsorbed and it is impractical to use a PSA process for gas removal. For example, the CaX adsorbent, which has a $K_{H,N2}$ of 3.69 mmole/gm/bara at 37.78° C., shows a significant performance drop, even though it has an effective nitrogen over argon selectivity similar to AgLiLSX, as can be seen in Table 6. Alternatively, too low of Henry's constant for nitrogen having poor effective nitrogen over argon selectivity would result in very poor performances as can be seen from Table 6 with NaX adsorbent. Note that the performances from the inventive $Zn_{4.1}Li_{1.1}Na_{0.5}RHO(3.9)$ for nitrogen removal having reasonable Henry's constant performs quite well under layering model for simultaneous oxygen and nitrogen removal (Table 5, Case 2) even though its effective nitrogen over argon selectivity is relatively low at 6.55.

The invention claimed is:

1. A process of adsorbing oxygen from a feed stream containing oxygen, comprising passing the feed stream through a bed of an adsorbent selective for oxygen so as to adsorb oxygen from the feed stream, thereby producing a product stream depleted in oxygen, wherein the adsorbent comprises a RHO zeolite having a Si/Al ratio of from 3.2 to 4.5 and containing non-proton extra-framework cations, wherein the size, number, and charge of the extra-framework cations that are present in the zeolite are such that 1.8 or fewer non-proton extra-framework cations per unit cell are required to occupy 8-ring sites, and wherein the zeolite has a unit cell axis length of from 14.23 Å to 14.55 Å.

2. The process of claim 1, wherein the feed stream comprises oxygen and one or both of nitrogen and argon, and the product stream is depleted in oxygen and enriched in one or both of nitrogen and argon.

3. The process of claim 1, wherein the size, number and charge of the extra-framework cations that are present in the zeolite are such that 1.6 or fewer non-proton extra-framework cations per unit cell are required to occupy 8-ring sites.

4. The process of claim 1, wherein the zeolite contains at most 6 protons per unit cell.

5. The process of claim 1, wherein the zeolite contains at most 4 protons per unit cell.

6. The process of claim 1, wherein the zeolite contains at most 3 protons per unit cell.

7. The process of claim 1, wherein the zeolite has a unit cell axis length of from 14.23 Å to 14.50 Å.

8. The process of claim 1, wherein the zeolite has a unit cell axis length of from 14.30 Å to 14.45 Å.

9. The process of claim 1, wherein the zeolite has a Si/Al ratio of from 3.6 to 4.2.

10. The process of claim 1, wherein the non-proton extra-framework cations comprise $Li^+$, $Mg^{2+}$, $Mn^{2+}$, $Fe^{2+}$, $Co^{2+}$, $Ni^{2+}$, $Cu^{2+}$ and/or $Zn^{2+}$ cations.

11. The process of claim 1, wherein the non-proton extra-framework cations comprise $Li^+$ and/or $Zn^{2+}$ cations.

12. The process of claim 11, wherein said $Li^+$ and/or $Zn^{2+}$ cations make up the majority of the non-proton extra-framework cations that are present per unit cell.

13. The process of claim 11, wherein said $Li^+$ and/or $Zn^{2+}$ cations make up at least 70% of the non-proton extra-framework cations that are present per unit cell.

14. The process of claim 11, wherein said $Li^+$ and/or $Zn^{2+}$ cations make up at least 80% of the non-proton extra-framework cations that are present per unit cell.

15. The process of claim 1, wherein the zeolite is selected from $H_6Li_{5.4}RHO(3.2)$, $Li_{9.0}K_{0.8}RHO(3.9)$, $Li_{9.0}Na_{0.8}RHO(3.9)$, $Li_{8.3}Cs_{1.5}RHO(3.9)$, $Li_{8.0}Zn_{1.7}RHO(3.2)$, $Zn_{4.1}Na_{1.6}RHO(3.9)$, $Li_{9.2}H_{0.6}RHO(3.9)$, $Li_{9.2}RHO(4.2)$, $Li_{6.0}H_{1.8}Zn_{1.0}Na_{0.6}RHO(3.6)$, $Li_{7.8}H_{2.0}RHO(3.9)$, $Li_{6.8}H_{3.0}RHO(3.9)$ and $Li_{5.8}H_{4.0}RHO(3.9)$.

16. The process of claim 1, wherein the process is a PSA process comprising an adsorption step performed at elevated pressure in which the feed stream is passed through a bed of the adsorbent comprising the RHO zeolite to adsorb oxygen from the feed stream, and a desorption step performed at reduced pressure in which oxygen from the previous adsorption step is desorbed from the bed to regenerate the bed for the next adsorption step.

17. The process of claim 1, wherein the process is process of adsorbing oxygen and nitrogen from a feed stream comprising oxygen, nitrogen, and argon, comprising passing the feed stream through one or more beds of adsorbent comprising a first adsorbent selective for nitrogen to adsorb nitrogen from the feed stream and a second adsorbent comprising the RHO zeolite to adsorb oxygen from the feed stream, thereby producing a product stream enriched in argon and depleted in oxygen and nitrogen.

18. The process of claim 17, wherein the first adsorbent has a Henry's law constant for nitrogen of from 0.5 to 3.0 mmole/gm/bara at 37.78° C.

19. The process of claim 17, wherein the process is a PSA process comprising an adsorption step performed at elevated pressure in which the feed stream is passed through a bed of adsorbent comprising the first and second adsorbents to adsorb nitrogen and oxygen, respectively, thereby producing a product stream enriched in argon and depleted in oxygen and nitrogen, and a desorption step performed at reduced pressure in which oxygen and nitrogen from the previous adsorption step are desorbed from the bed to regenerate the bed for the next adsorption step.

20. The process of claim 19, wherein the bed of adsorbent comprises a first layer comprising the first adsorbent and a second layer comprising the second adsorbent, the first and second layers being arranged such that during the adsorption step the feed stream passes through the first layer and contacts the first adsorbent for adsorption of nitrogen before passing through the second layer and contacting the second adsorbent for adsorption of oxygen.

* * * * *